(12) United States Patent
Slack et al.

(10) Patent No.: US 7,881,577 B1
(45) Date of Patent: Feb. 1, 2011

(54) NANOTUBE STRUCTURES AND METHODS FOR MAKING AND USING NANOTUBE STRUCTURES

(76) Inventors: Sherburne Slack, 80 Blackberry Way, Point Reyes, CA (US) 94956; Carlo Pantano, 264 Deibler Rd., PA Furnace, PA (US) 16865

( * ) Notice: Subject to any disclaimer, the term of this patent is extended or adjusted under 35 U.S.C. 154(b) by 807 days.

(21) Appl. No.: 11/528,708

(22) Filed: Sep. 26, 2006

Related U.S. Application Data

(60) Provisional application No. 60/720,333, filed on Sep. 26, 2005.

(51) Int. Cl.
*G02B 6/04* (2006.01)
*B01L 3/02* (2006.01)

(52) U.S. Cl. ...................... 385/115; 422/100
(58) Field of Classification Search ................. 385/115; 422/100
See application file for complete search history.

(56) References Cited

U.S. PATENT DOCUMENTS

| | | | | |
|---|---|---|---|---|
| 4,010,019 A | * | 3/1977 | Cole et al. | 65/36 |
| 4,853,020 A | * | 8/1989 | Sink | 65/409 |
| 5,234,594 A | * | 8/1993 | Tonucci et al. | 210/500.26 |
| 5,264,722 A | * | 11/1993 | Justus et al. | 65/31 |
| 6,953,551 B2 | | 10/2005 | Chen et al. | 422/100 |
| 7,150,904 B2 | * | 12/2006 | D'Urso et al. | 428/116 |

OTHER PUBLICATIONS

Liesbeth Venema, "*Small Talk*", Aug. 2006, Nature, Int'l Weekly Journal of Science, vol. 442/31, p. 994-995, www.nature.com/nature.

* cited by examiner

*Primary Examiner*—Glenn Caldarola
*Assistant Examiner*—Randy Boyer
(74) *Attorney, Agent, or Firm*—Martine Penilla & Gencarella, LLP

(57) ABSTRACT

Structures and method for making, using and implementing a drawn preform from a plurality of tubes are provided. The drawn preform includes a first end of the preform defining source side of the preform and a second end of the preform defining a delivery side of the preform. At least some tubes of the plurality of tubes of the second end of the preform are drawn to a dimension of at least less than one micron in size. The drawn preform is capable of including conductors integrated with the tubes, and the conductors enable manipulation of materials (e.g., fluids, chemicals, biological samples, solids, inks, etc.) as the go through the tubes from a source end to the delivery end, or when the material is already present on a target substrate or receiving cell or material.

7 Claims, 54 Drawing Sheets

16 REFRACTORY VESSEL

16 REFRACTORY VESSEL

18 OVEN

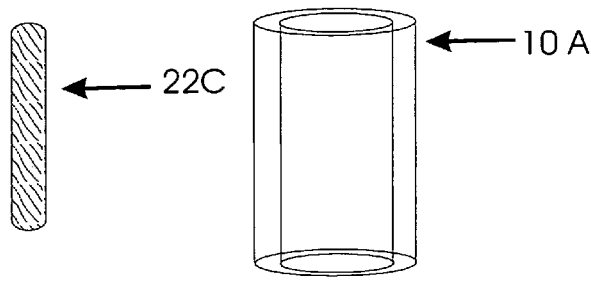
Fig. 10
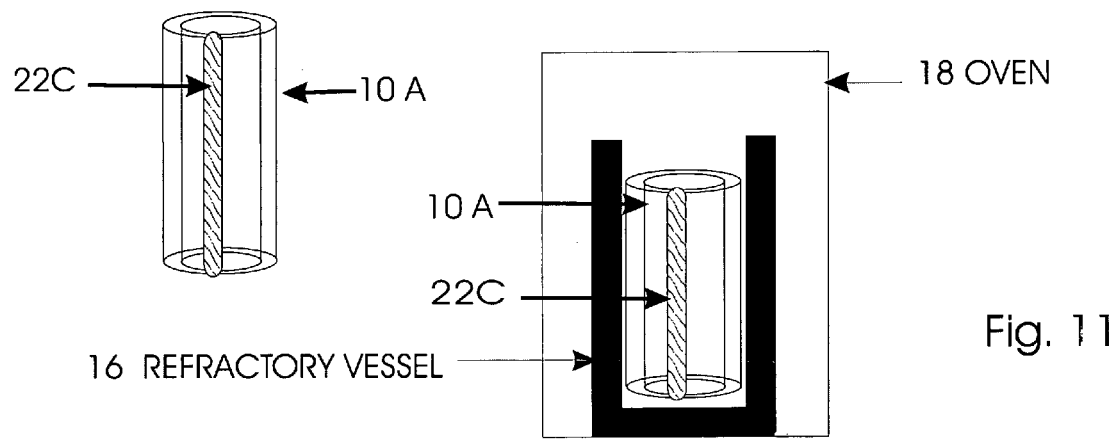
16 REFRACTORY VESSEL
Fig. 11
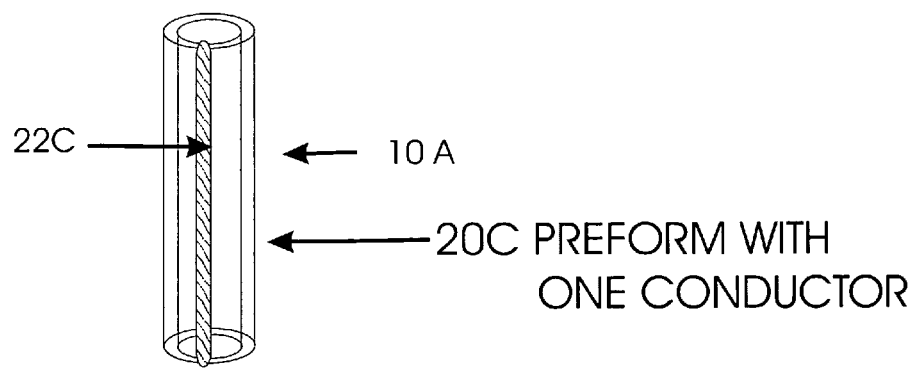
20C PREFORM WITH ONE CONDUCTOR

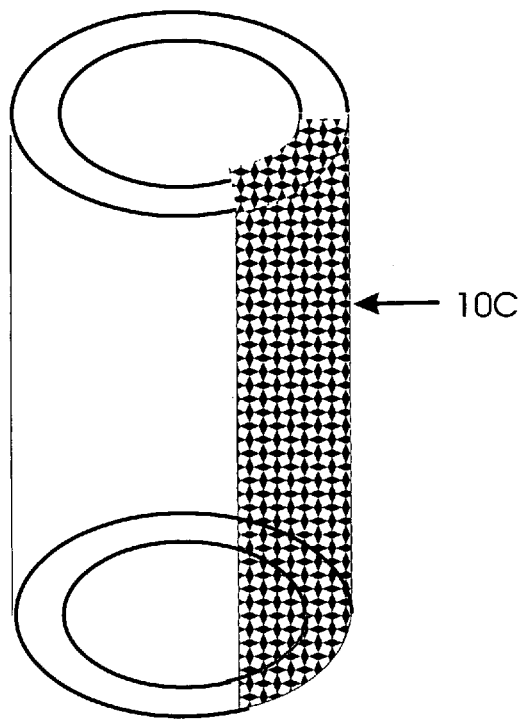
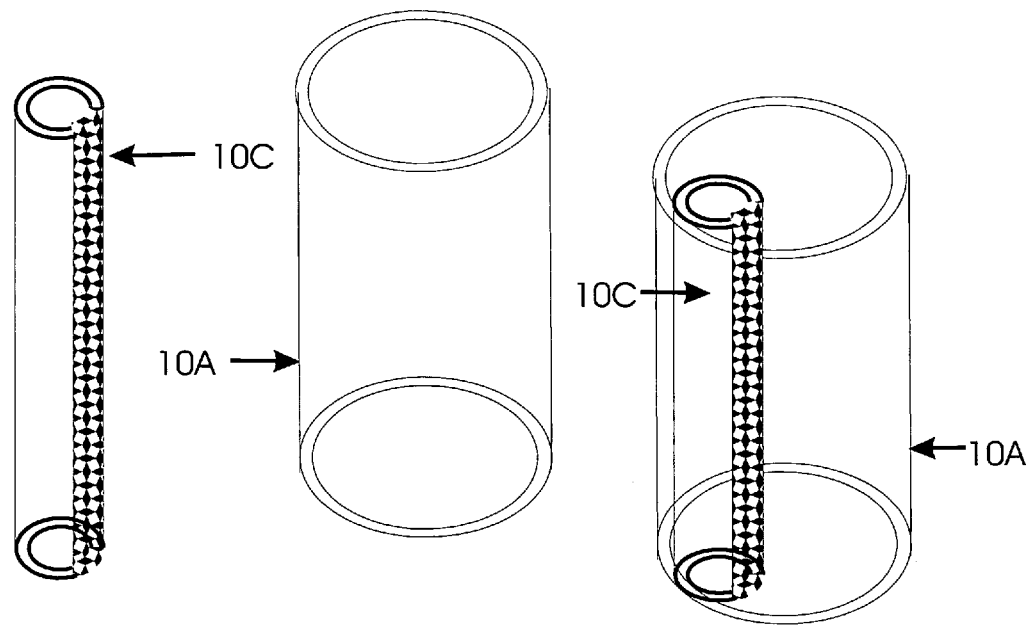
Fig. 23

END VIEW

30 OVEN MICROWAVE

32 OPENING

20A

34 SUSCEPTOR

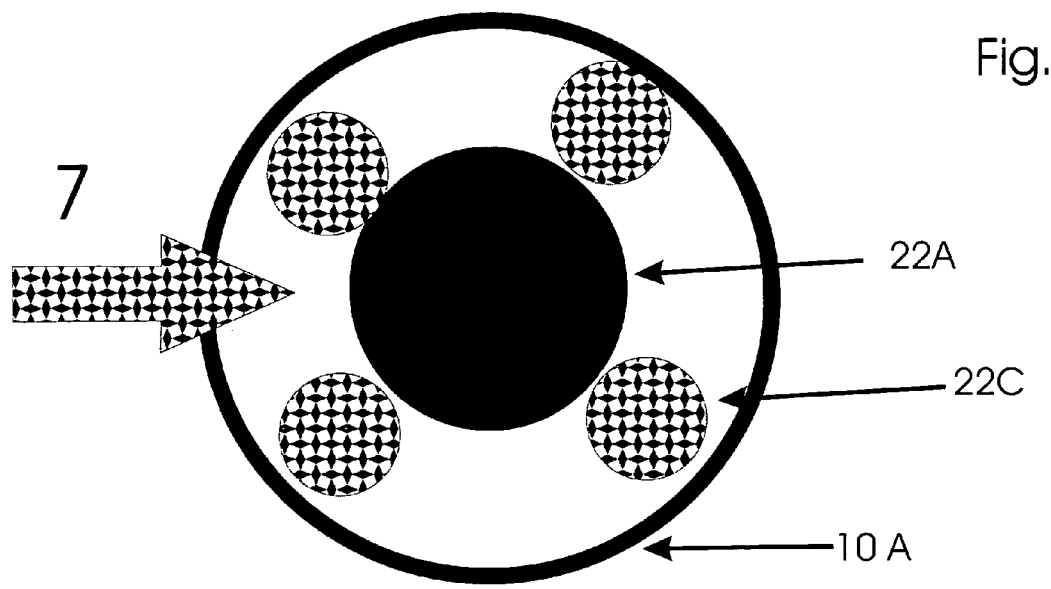
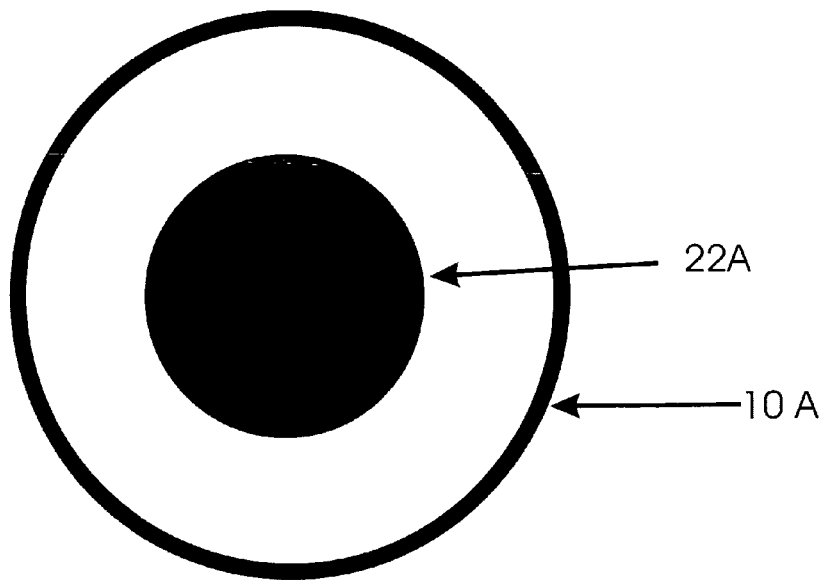
Fig. 72

Fig. 73
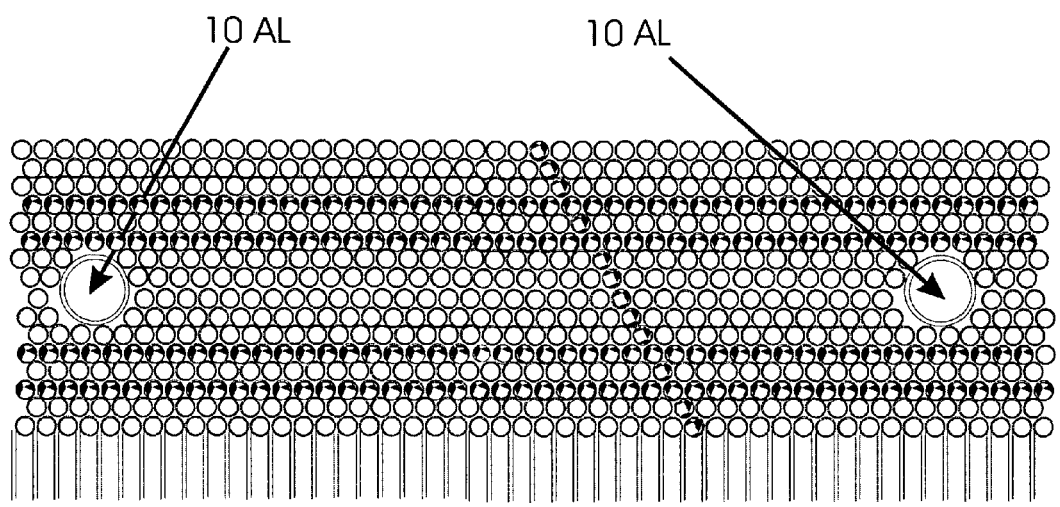
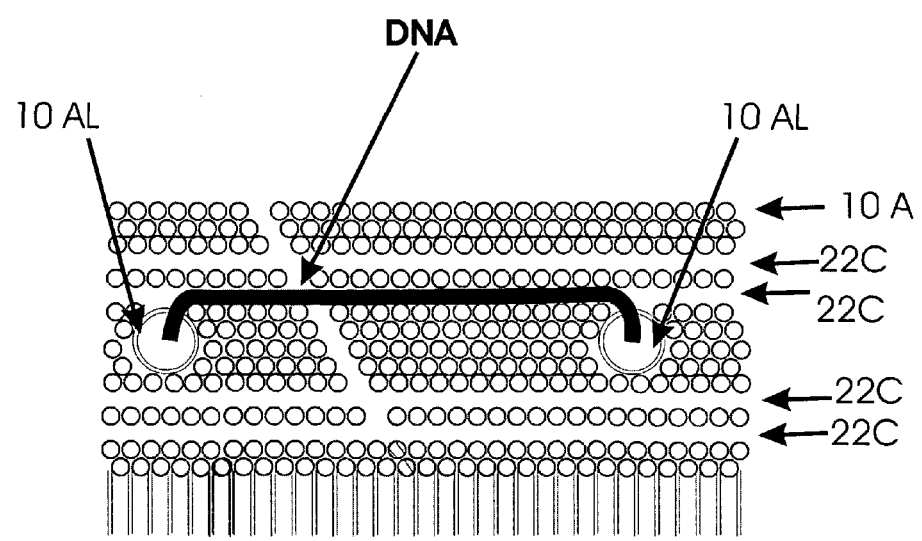

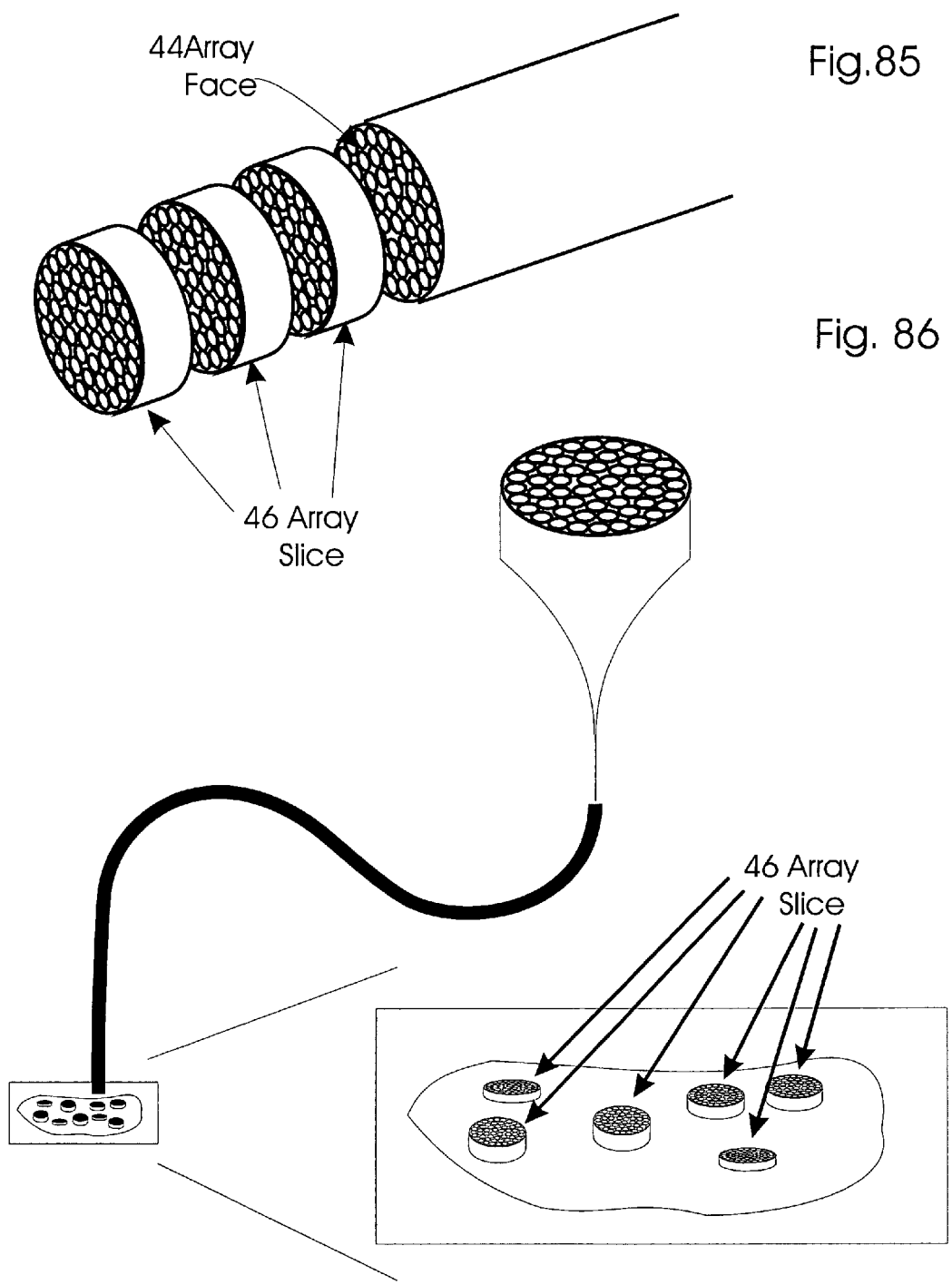

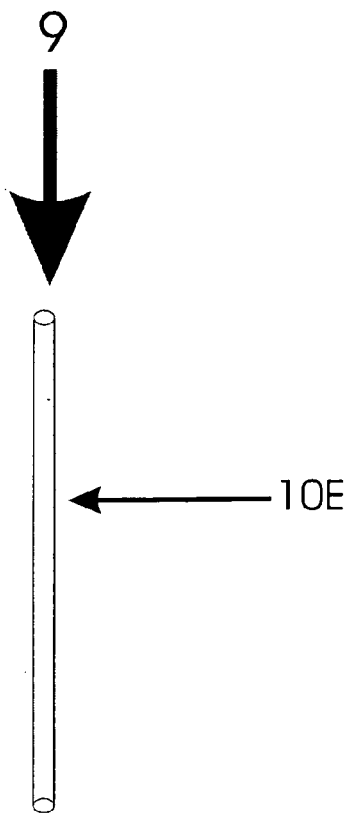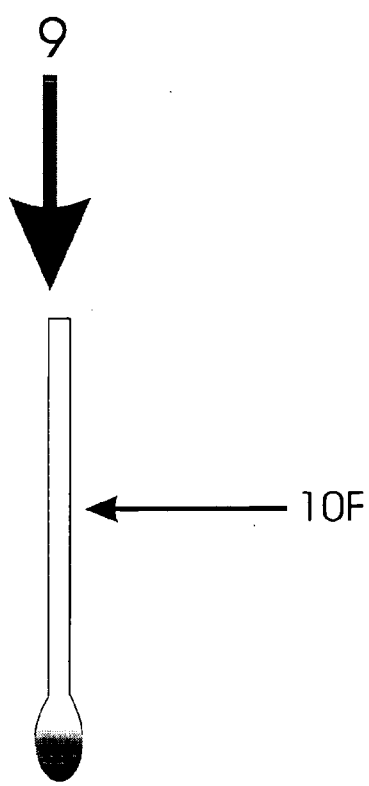
Fig. 89

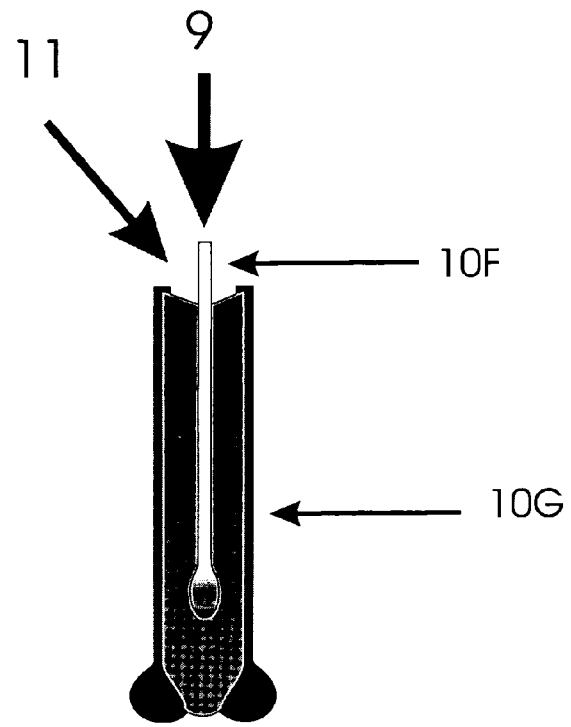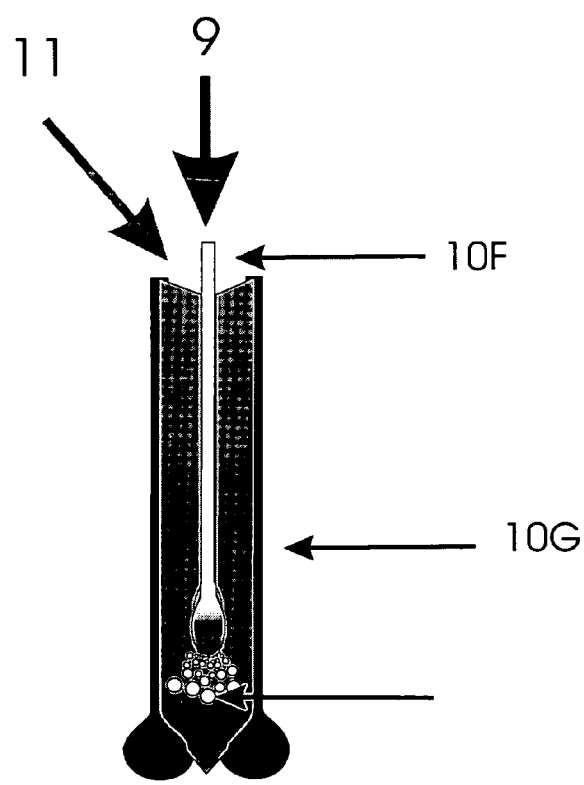
Fig. 93

NANOTUBE STRUCTURES AND METHODS FOR MAKING AND USING NANOTUBE STRUCTURES

CLAIM OF PRIORITY

This Application claims priority to U.S. Provisional Patent Application No. 60/720,333, filed on Sep. 26, 2005, and is herein incorporated by reference in its entirety.

FIELD OF THE INVENTION

The present invention relates to the manufacture of tube structures having at least one end in the nanometer range, and more particularly, to structures and methods for fabricating, using and implementing addressable and controllable systems from a plurality of tubes constructed from drawn preforms.

BACKGROUND

The art of nanotechnology has grown in popularity and investigation in recent years. The growth in the nanotechnology field has, however, been impeded by a lack in tools to operate effectively in the nanometer scale. For instance, although much investigation has occurred in the field, the tools available to handle, manipulate or operate on materials, samples and objects in this dimension have lagged behind. Without additional tools to allow human scientists and engineers to work at in the nanometer scale, a void in knowledge will continue to exist, scientific interaction is not currently possible in these dimensions.

Due to the promised advantages of working at smaller scales, companies involved in printing have begun to construct simple tube implementations to reach into the tens of microns size dimensions. These tube designs are not taught to be constructed to the nanometer scale. Tubes in the micron size, whoever, are able to deliver inks to very small locations, so as to achieve a desired printed object. Reference can be made to U.S. Pat. No. 6,953,551, entitled "Microarray Fabrication Techniques and Apparatus", for more information on microarray printing systems. This U.S. Patent is incorporated herein by reference. Additional reference can be made to U.S. Patent Publication 2003-0143725, entitled "Microarray fabrication techniques and apparatus". This U.S. Patent Publication is incorporated herein by reference.

In view of the foregoing, there is a need for methods, structures and systems for constructing, using and implementing nanoscale tools.

SUMMARY

Embodiments of the present invention provide methods and apparatus for making, designing, fabricating, implementing and using nanotube structures. The nanotube structures can be used to communicate materials from one end (larger end) to another end (nano-scale end). Tubes can be defined from a collection of tubes, and the collection of tubes can be defined into a preform, which is then drawn so that a nanoscale dimension is possible at the end opposite the larger non-drawn end. The end having the nanoscale dimensions can also include some tubes that are larger than nano scale, a mixture of sizes, and shapes.

The bundle of tubes can be formed into any shape, such as a circle, a square, a rectangle, triangle or any shape needed for the particular application. The drawn preform can also include one or more conductors. The conductors can be in the form of solid rods, chemically applied gas metal coatings, or insulated glass tubes, with conductive materials applied to the walls of the insulated tubes. The conductive devices (e.g., tubes, rods, walls), can then be connected to conductors to provide a particular current. The current can be applied so as to form a magnetic field around the conducting rods, tubes, etc.

In one embodiment, materials are passed through the tubes having the conductors, and the material can be made to react to either the current or the magnetic fields. The currents can therefore affect the material as it moves down the tube to a target location. The interaction with the material can occur along the tube or when the material reaches the target. In some cases, the interaction with the material will enable certain manipulation of material samples in such a way not possible at the target location. Additionally, some of the currents or voltages can be applied to two or more rods or conductors in a single tube. The two or more conductors can help interact with a material flowing in the tube, and control its course down the tube, or can assist in manipulating its position or physical state. The interaction can also be such that the material is caused to controllably exit or move, based on the applied voltages, currents or magnetic fields.

The currents, voltages and connections can be controlled through a head that couples to the larger end, and the interaction can be guided by a computer. The computer can operate using a specially designed program or program that can manipulate the interaction by way of a graphical user interface. The graphical user interface can provide usual or graphical animation on a computer screen, to enable the user to understand what is happening to a material sample as it makes its way down the tube or interacts at the target nonoscale location. The graphics on the computer can also display feedback from the sample though sensors in particular ones of the tubes. The feedback can therefore provide real-time response and information that can be useful in determining interactions, possible modifications to current interactions or changes in future or current testing or manipulations.

As should be understood, the material can be in the form of a solid, a fluid, a semi-fluid, a mixture of solids and fluids, a chemical, a biological sample or samples, cells, organisms, inks, colored fluids, conductive fluids, light, heat, air, gas, energy, etc. Depending on the application, the nanotube structure can be modified, as disclosed herein, to meet the application. As noted herein, the application of the nanotubes are numerous, but for completeness, reference can be made to the examples provided, which are not limited in any way to only the examples, but modifications possible within the scope of the appended claims.

It should be appreciated that the present invention can be implemented in numerous ways, such as a process, an apparatus, a system, a device or a method on a computer readable medium. Several inventive embodiments of the present invention are described below.

Structures and method for making, using and implementing a drawn preform from a plurality of tubes are provided. The drawn preform includes a first end of the preform defining source side of the preform and a second end of the preform defining a delivery side of the preform. At least some tubes of the plurality of tubes of the second end of the preform are drawn to about a nanometer in size. The drawn preform is capable of including conductors integrated with the tubes, and the conductors enable manipulation of materials (e.g., fluids, chemicals, biological samples, solids, inks, etc.) as they go through the tubes from a source end to the delivery end, or when the material is already present on a target substrate or receiving cell or material.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIGS. 10-16 illustrate examples of using conductors on the walls of tubes;

FIGS. 17-31 illustrate examples of using soluble tubes in conjunction with non-soluble tubes, to define structures capable of interacting with materials via fluids, light, energy and electricity;

FIGS. 72-75 illustrate methods and techniques that can be used to work with material samples at different intersections of a drawn preform;

FIGS. 85-88 provide examples of other applications, in accordance with the invention; and FIGS. 89-93 and 98-99 illustrate example uses of the tubes and pressure application techniques for delivering controlled amounts of fluids/materials at particular times, through selected ones of the plurality of tubes, and controlled by applied heat imparted by IR energy (or other types of energy).

DETAILED DESCRIPTION

Figure 1:
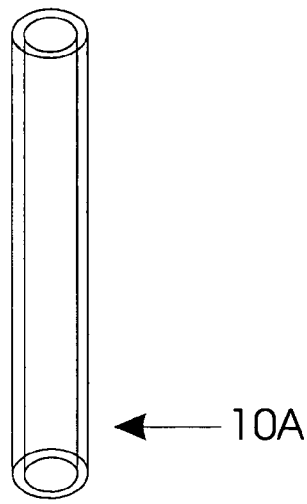
FIGS. 1-9 illustrate examples for making a preform from a plurality of tubes.

As defined herein, nanotechnology is working with devices at a submicroscopic scale. The scale is billionths of a meter. This is the size of large molecules. For comparison, a red blood cell is about 2000 nanometers. As is know, some substances and molecules can behave differently at nano-scale. Reactions may speed up and some reactions not possible at large scale only take place at nano-scale. Based on these qualifications, the present invention defines structures and method to enable the working, handling, testing, and experimenting etc. with substances, samples, fluids, biological cells or samples, and other materials or matters. Thus, broadly speaking, the methods and apparatus defined herein enable many structures to be defined, which enable the working with many target sources, which cannot effectively be handled or experimented outside of the nanometer scale.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention. Several exemplary embodiments of the invention will now be described in detail with reference to the accompanying drawings.

In one embodiment, a glass tube or group of tubes and/or rods, which may be of nanometer dimensions, provide a way of conducting materials and charge from one end to the other. As defined herein, the conduction may be inside or outside the tubes or both, and there can be multiple conductors of different kinds in many possible permutations and combinations. This makes possible the conduction of electricity to the end of the tube or the completion of a circuit and/or physical manipulation of the end of the tube by virtue of interaction of the associated magnetic field with other similar tubes or other magnetic fields. Also the length and physical position and motion of the tubes and or rods may be altered by the effect of magnetic fields and or heat, and possibly other physical or mechanical means, which could prove useful in manipulating a tube or tubes or rod or rods in the course of investigation or manufacture performed by use of the assembly.

In one embodiment, the electric connection to the nanotubes may be accomplished with lithographic processes common to the chip industry. Other methods may be used to make the physical connections to the large ends of the tubes. For instance, conductive connectors can be provided, such that a voltage can be programmable supplied to particular conductors. The voltages can, for instance, be applied to one or more conductors that can be associated with particular tubes.

A manifold housing the physical attachments is mounted to the un-drawn end of a preform. The manifold is connected to valves, monitors, switches and any other physical, electrical or optical devices necessary for controlling or monitoring or interacting with the tubes or rods at the un-drawn end (e.g., larger end) of the preform. The larger end can by of any useful size, such as several millimeters, to typically about one millimeter or in the range of about 0.1 millimeter to about 5 millimeters. For convenience, the aforementioned devices could be assembled and interconnected to a controller unit. The controller unit may be connected to computer or electronics unit to enable software to control some or all activity. In this embodiment, for the assembly to be handled and used conveniently, it would be desirable that the draw (e.g., pulling apart to make a thinner end) down to nano size be done in a relatively short distance of about less than one or two meters. This can be accomplished by heating a narrow zone of the length of the tube assembly and then drawing the tubes. Another method is to heat a ring susceptor with microwaves and at the temperature when the glass is heated enough by radiation from the absorber that it becomes microwave absorbing, microwaves are then used to supply a small additional amount of energy which is just enough to allow the tubes to be drawn to nano size.

In this embodiment, microwaves give the advantage of finer control of energy transfer and more uniform distribution of energy. The shorter the length of the tube that is of nano dimension, the more efficient will be the flow of material through the tube. In one example, a substance or mixture of substances is sent through the tube and is affected by the electrical charge at the small end of the tube or along the path through the tube. The substance can be a solution or a mixture of material or a gas or a vapor. Multiple nanotubes can carry different materials which mix as they come out of the tubes (e.g., at the exit). In one example, the electrical charge may favorably influence the formation of compounds. In some embodiments magnetic fields may be used to influence tubes, rods and or materials, which are part of the process.

A piece of tubing consisting of glass or glassy material that is able to be drawn into a tube of decreasing diameter, as it approaches a molten state upon application of heat, is used to make nanotubes. In some embodiments, before the tube is drawn, a stripe or several stripes of glassy material which has an electrically conducting metal or material dissolved in or mixed with it is placed lengthwise on the inside or outside of the glass preform tube. The tube is pulled by itself or in a group of other tubes. In some examples, the tubes may be of different diameters. The stripe or stripes can be electrically conducting or can be made to be conducting (e.g., by being heat treated in a chemically reducing atmosphere) which brings the conducting atoms to the surface in a reduced metallic state. In these embodiments, conduction may be accomplished or improved by passing metal vapor through the tube at an appropriate pressure. The nucleation sites on the stripes' surface may augment the deposition of the vapor on the surface. In the case of silver or other elements used as a conductor, the atmosphere may be saturated with the vapor of the element that is the conductor to maintain the concentration of the element dissolved in the glass. A glass tube with one or more electrical conductors inside or outside or both, that is able to conduct an electric current or charge at nano-dimension, can be used in ways that will make possible new molecular compositions, new compounds with physical properties unattainable or not easily attainable by any other method or that may improve yield of known reactions.

More than one conducting stripe makes possible an electric potential or discharge at the gap between the endpoints of the stripes. A single stripe may conduct if the tube or rod is placed in contact or proximity to a conducting surface or solution. The stripes make possible an electric field around them the length of the tubes or rods, also a capacitance. This makes it possible to manipulate the tube by use of a magnetic or electric field applied to adjacent tubes or rods or from another source.

FIG. 1 is an example of a glass tube 10A. The glass material to make the glass tube 10A can be any glassy substance based on silica, or non-silica based materials. Thus, glass can be made from silica, quartz, mixtures of silver and phosphate, silica glasses, etc. Thus, the glass material can be made from any substance, so long as it defines a non-crystalline structure.

In one example, a diameter-to-wall thickness ratio of 10 to 1 is a desirable ratio for purposes of workability and utility for final use in many potential applications. Of course, the ratio may vary from 1 to 1 (e.g., solid rod) to 100 to one. In specific examples, the workable ratio can be about 1 to 5 and about 1 to 20.

Figure 2:
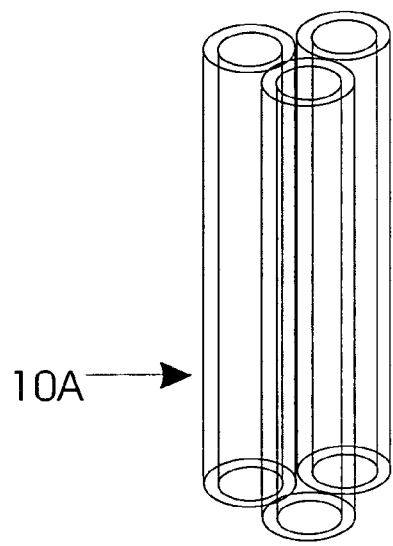
Figure 3:
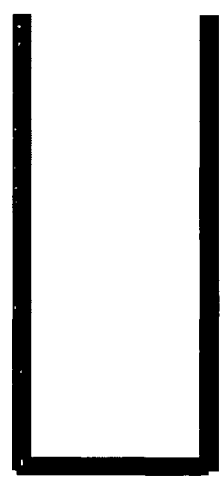
Figure 4:
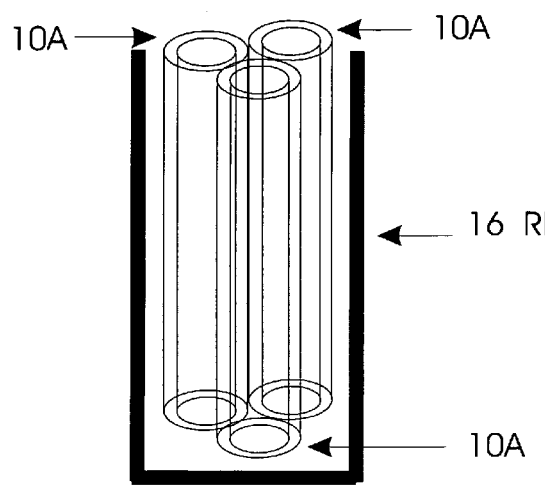
Figure 5:
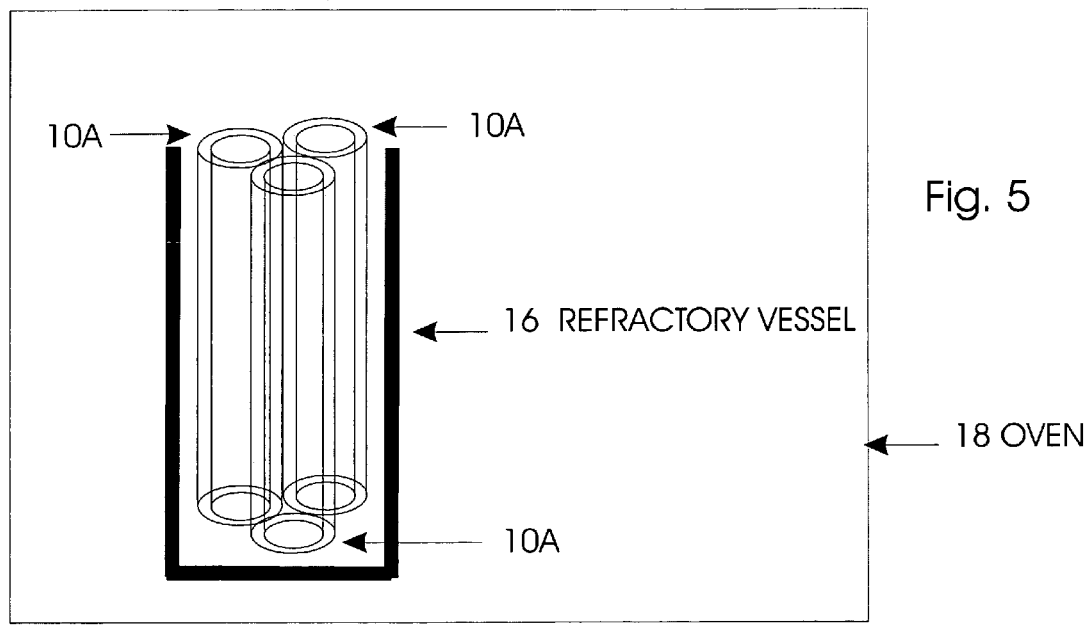

In FIG. 2 three glass tubes 10A are shown, and in FIG. 3 a refractory vessel 16 is shown. In FIG. 4 three glass tubes 10 are shown in refractory vessel 16. In FIG. 5 the vessel 16 containing tubes 10A is shown placed in oven 18. In this example, the tubes 10A are heated to their softening point and are fused together. The tubes are cooled and then removed from the refractory vessel.

Figure 6:
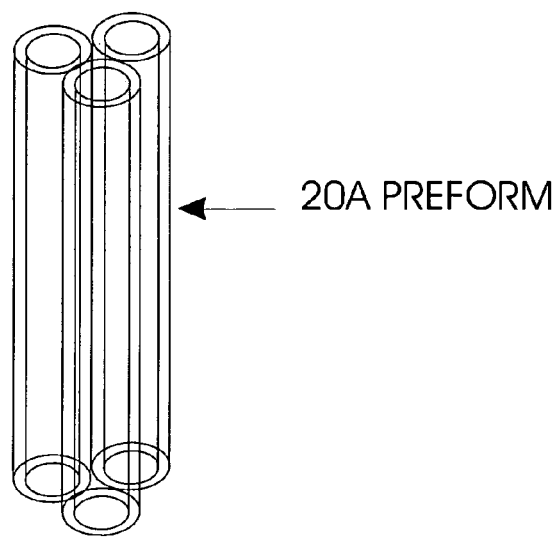
Figure 7:
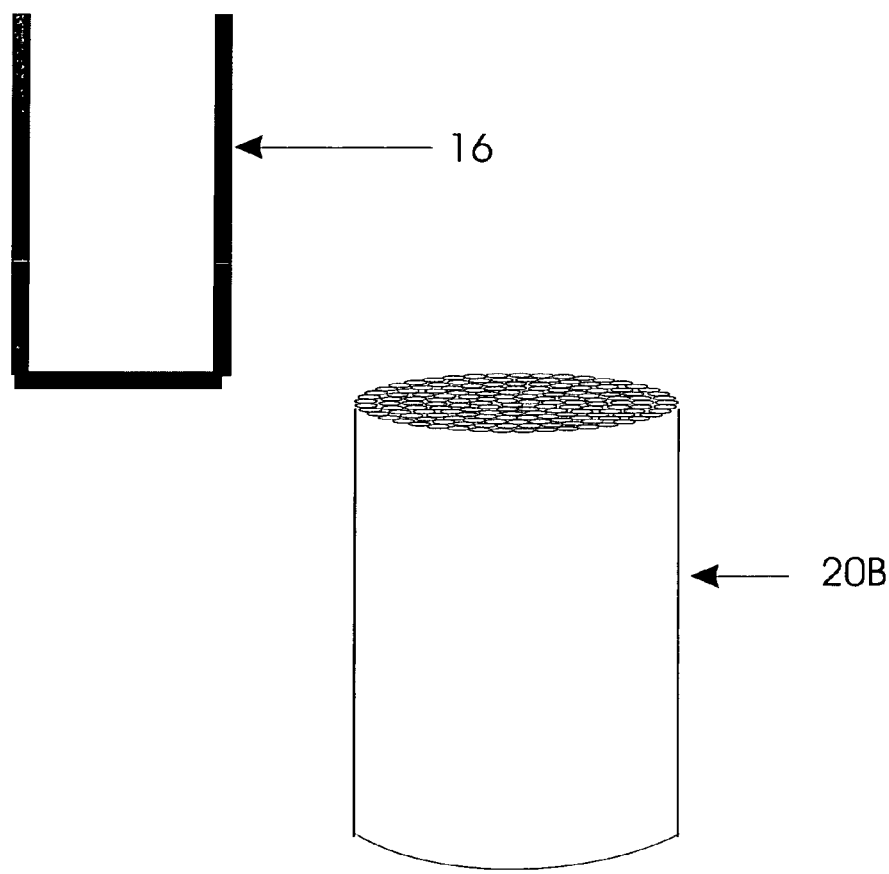

In FIG. 6 the group of fused tubes will define a preform 20A. In FIG. 7 a group of glass tubes 10A comprised of 40 to 100 glass tubes 10A and ceramic vessel 16 is shown. Of course, the actual number of glass tubes 10A will vary, depending on the application.

Figure 8:
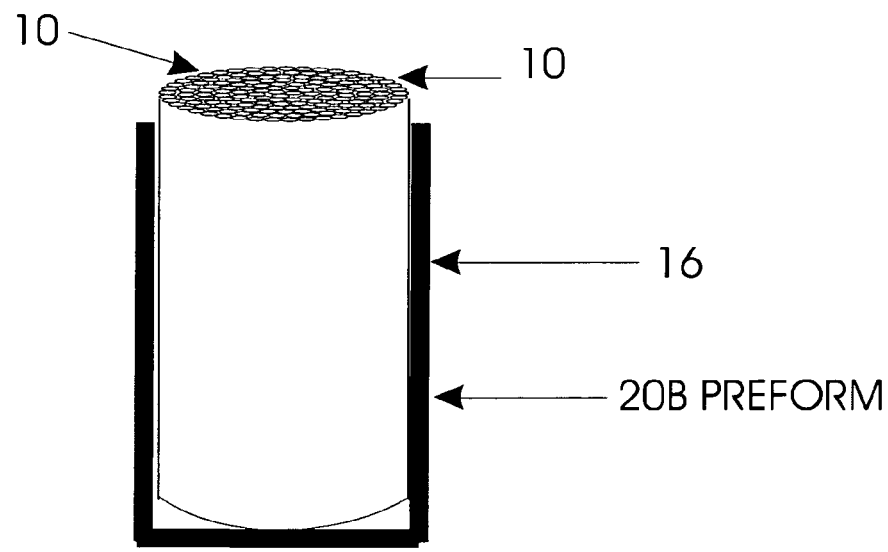

In FIG. 8 vessel 16 containing tubes 10A is shown. Vessel 16 containing tubes 10A is shown placed in an oven and heated, and the tubes are fused together as in the previous example shown in FIG. 5.

Figure 9:
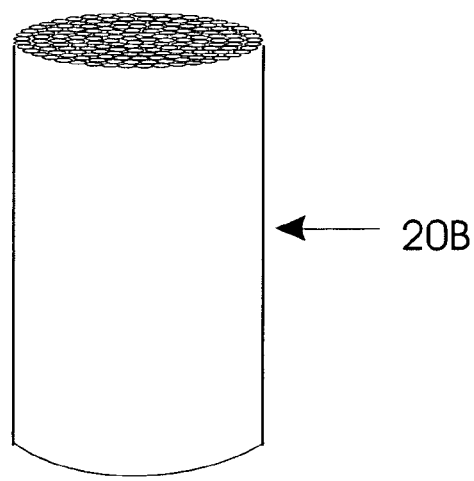
Figure 12:
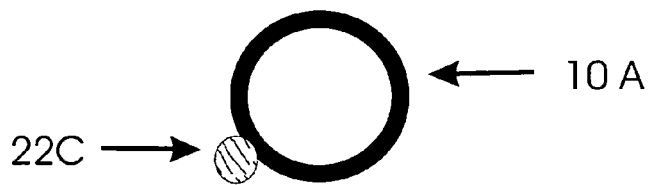
Figure 13:
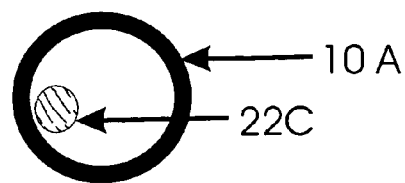
Figure 14:
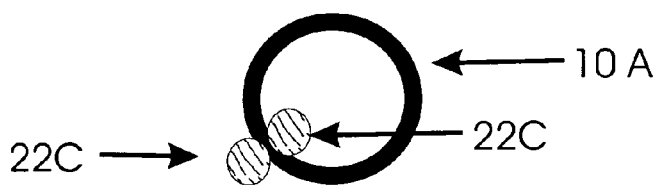
Figure 15:
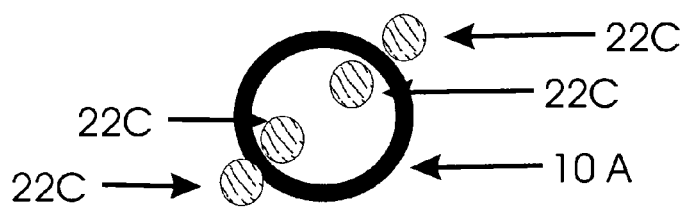
Figure 16:
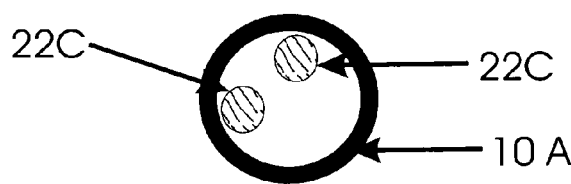
Figure 17:
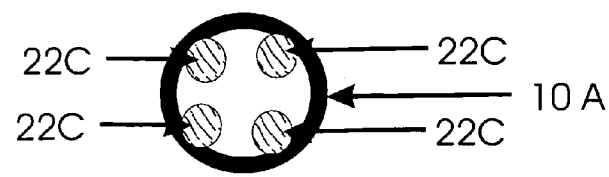

In FIG. 9 the fused assembly of tubes defines a preform 20B. A preform can be composed of as many tubes and/or rods as necessary. The rods and/or tubes can be the same or of various different diameters, e.g., such as in a case where tubes have different diameter-to-wall thickness ratios. In one embodiment, however, the preform is assembled from all similar size tubes. Preforms can also be made by chemical vapor deposition, as in the case of making fiber for fiber optic cable.

In FIG. 10 a glass tube and a glass rod 22C are shown. In this embodiment, glass rod 22C is composed of glass which has silver dissolved in it. In other embodiments, different conducting materials may be dissolved in the glass, so long as it is made conductive.

In this example, glass rod 22C and glass tube 10A are placed in contact with one another along their longitudinal axes in refractory vessel 16. In FIG. 11, vessel 16 and its contents are heated in oven 18 to a fusing point. Then, they are allowed to cool. In this example, glass rod 22c and glass tube 10A have been fused together to make the preform 20C. It should be understood, however, that there are many embodiments of 20C. FIGS. 12 through 17 illustrate some of these examples of preforms 20C.

Figure 18:
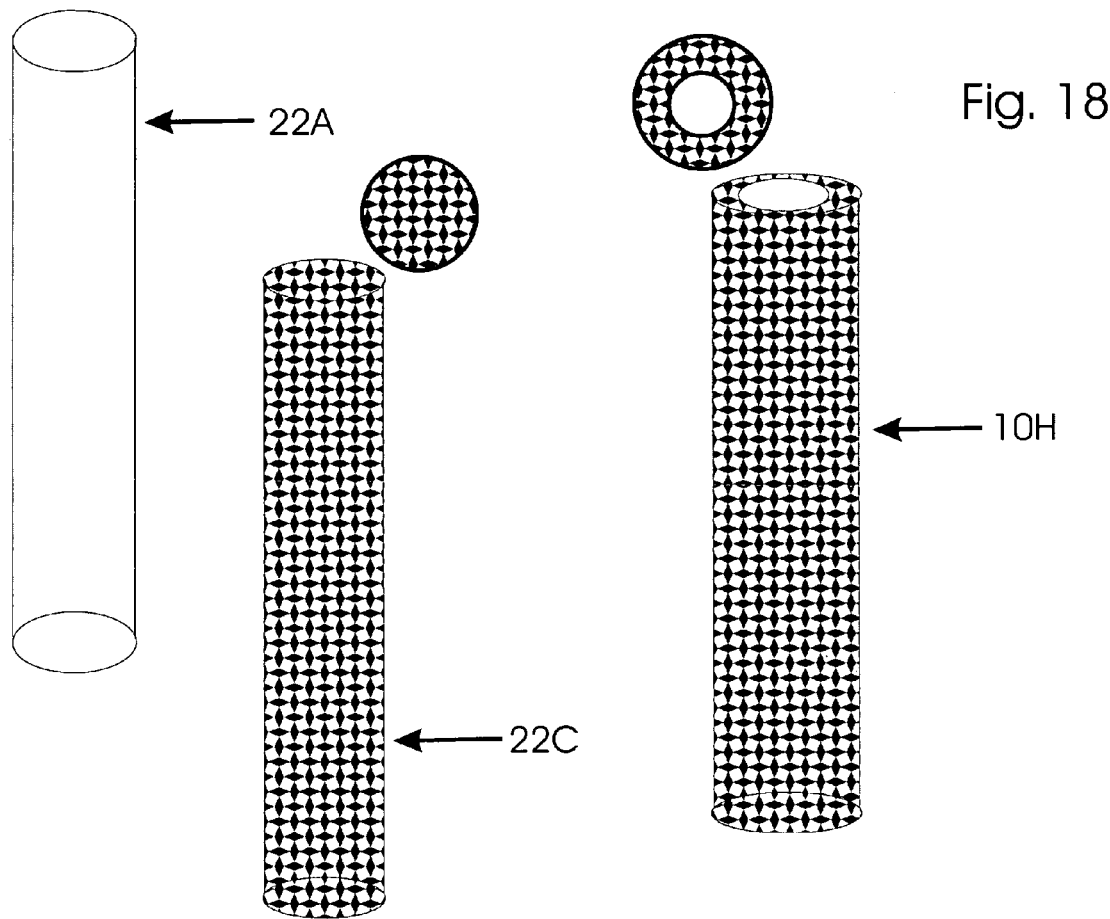
Figure 19:
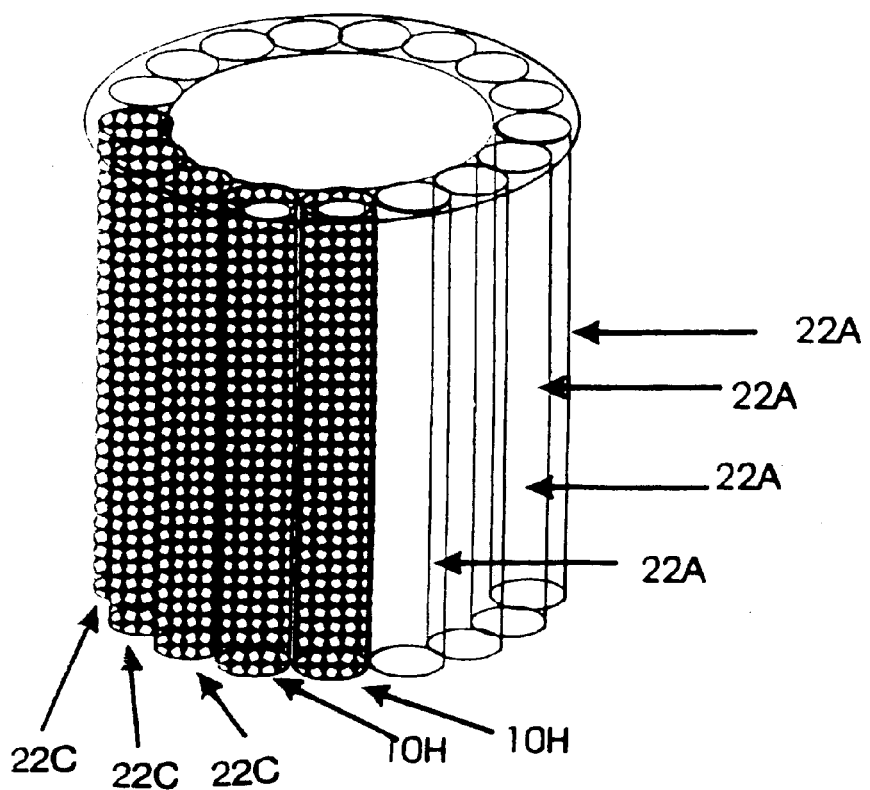

In FIG. 18 glass rod 22A is shown. Also in FIG. 18, glass tube 10H and glass rod 22B consist of a glass that is soluble in some substance. Glass rod 22A is less soluble in the substance than is glass rod 22B or glass tube 10H. In FIG. 19, glass rods 22A are placed vertically around the perimeter of a circle forming a partial circumference of the circle. Glass rods 22B and/or glass tubes 10H form the remaining arc which completes the circle.

Figure 20:
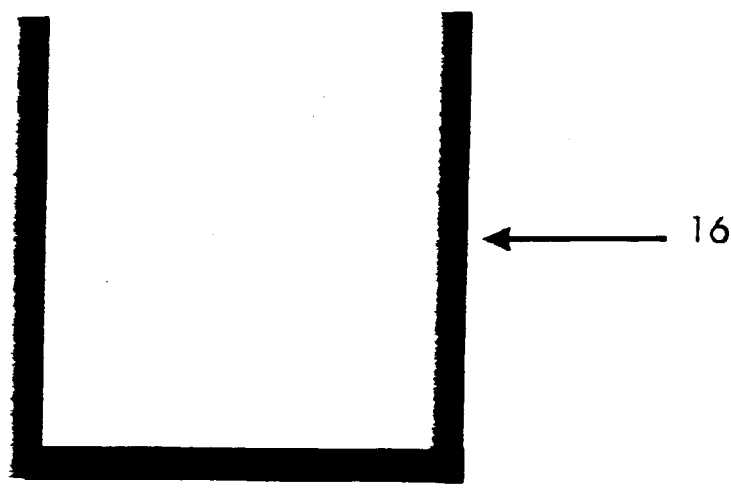
Figure 21:
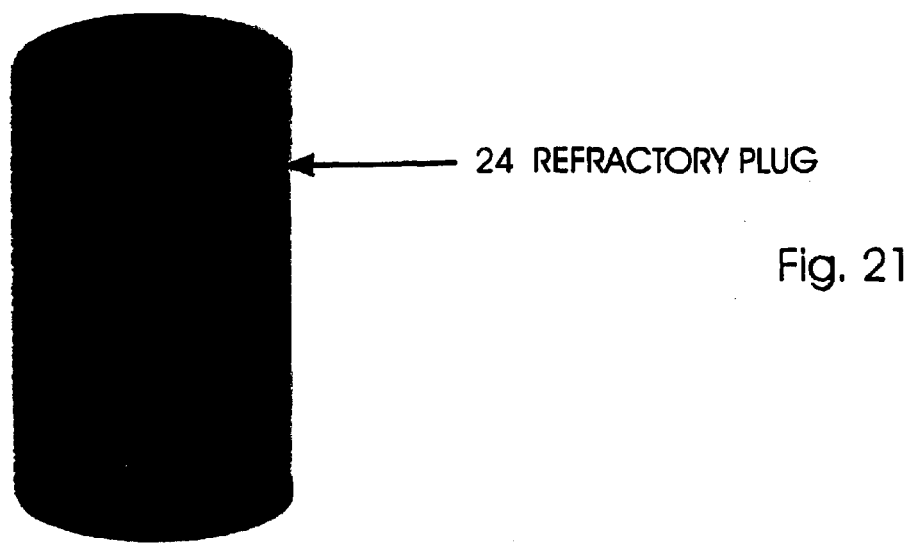
Figure 22:
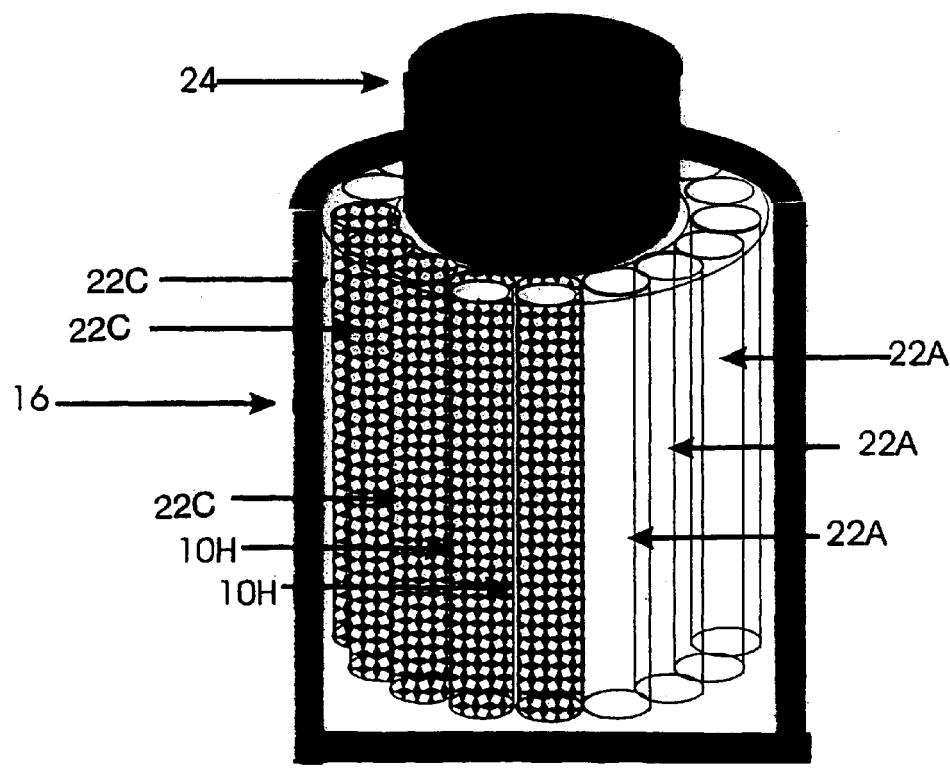

FIG. 20 shows refractory vessel 16. FIG. 21 shows refractory plug 24 which is used with refractory vessel 16. FIG. 22 shows glass rods 22A and 22B and glass tubes 10H held in place in refractory vessel 16 by refractory plug 24, when they are heated and fused in oven 18.

Figure 24:
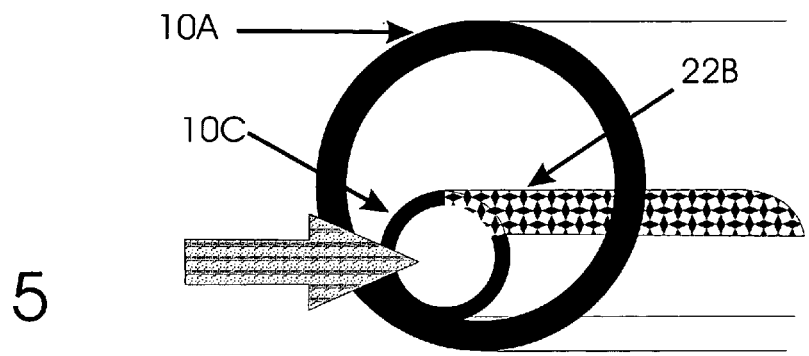

In FIG. 22, refractory plug 24 holds glass rods 22A and 22B and glass tubes 10H in place. Refractory vessel 16 containing the glass rods is placed in oven 18. In this embodiment, glass rods 22A and 22B and glass tubes 10H are heated to their fusing point. In FIG. 23, the fused assembly of rods is a preform 10C. Glass tube 10C is placed inside glass tube 10A. In FIG. 24, vapor 5 which can be a metallic vapor such as silver or another material which has some desirable property and is passed through preform 10C. In this example, vapor 5 deposits on the surface of glass tube preform 10C. In this embodiment, vapor 5 is metallic. Of course, other methods may be possible for depositing material on a glass surface. Also, material can be deposited from solution.

Figure 25:
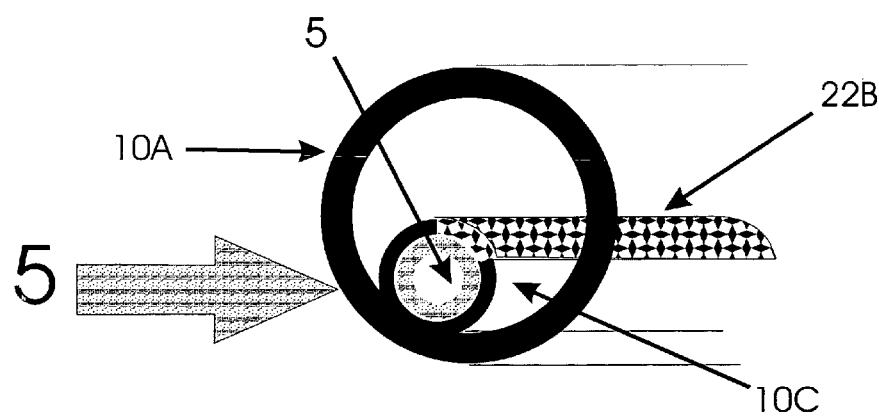
Figure 26:
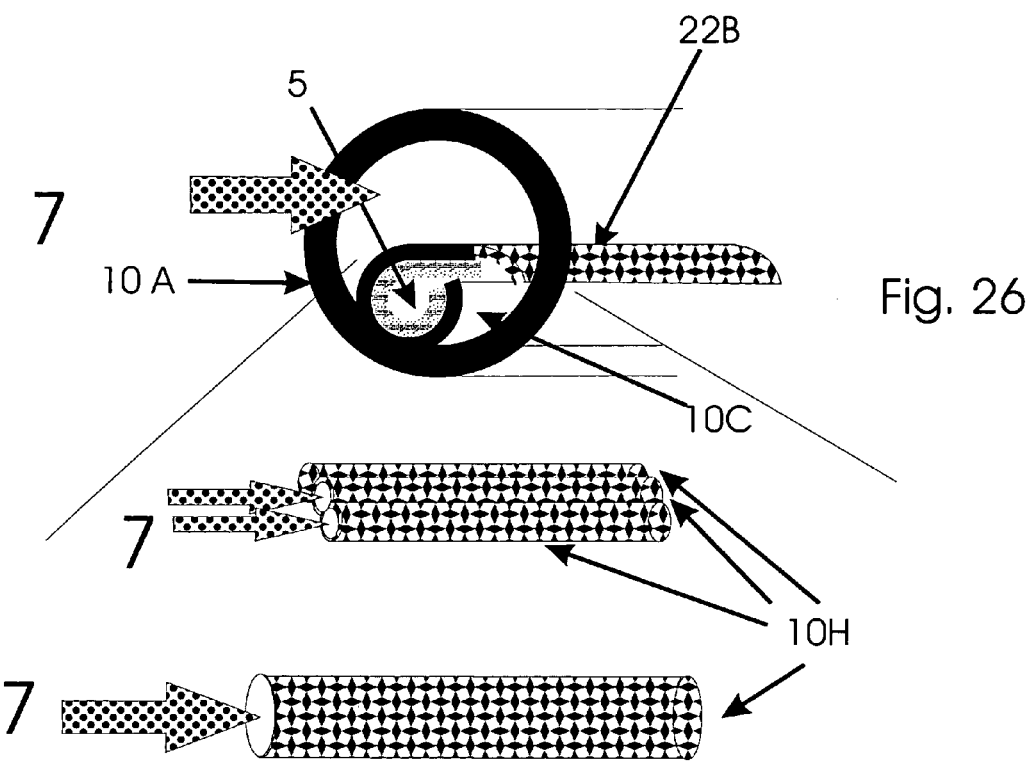
Figure 27:
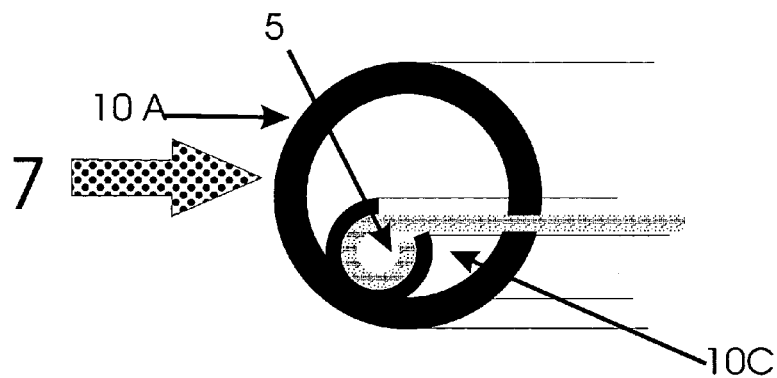
Figure 28:
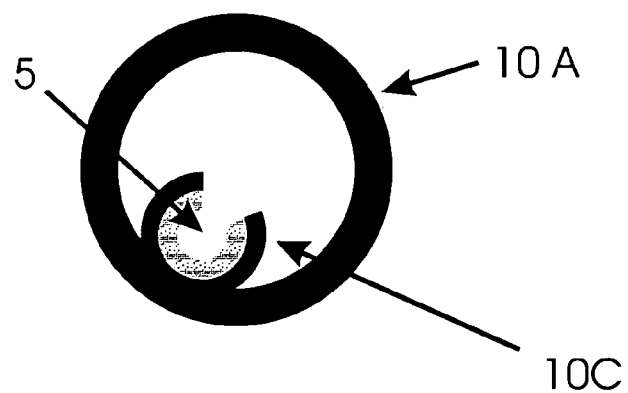
Figure 29:
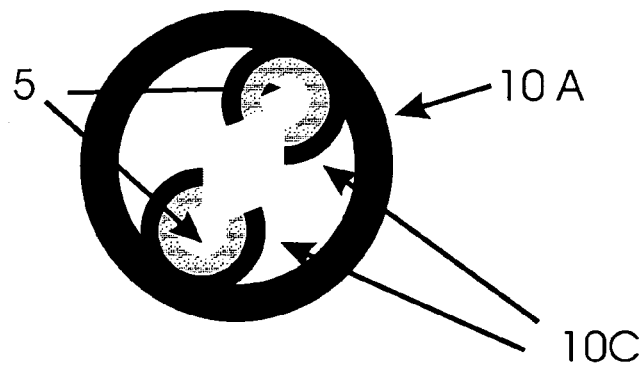
Figure 30:
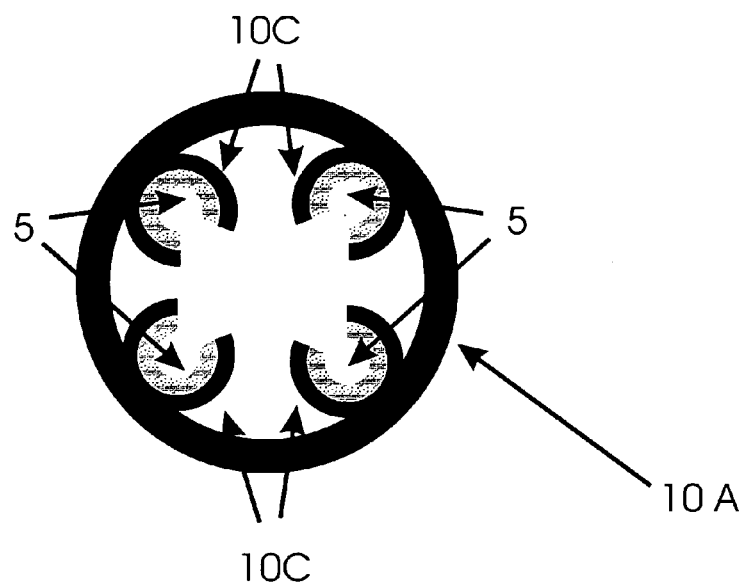
Figure 31:
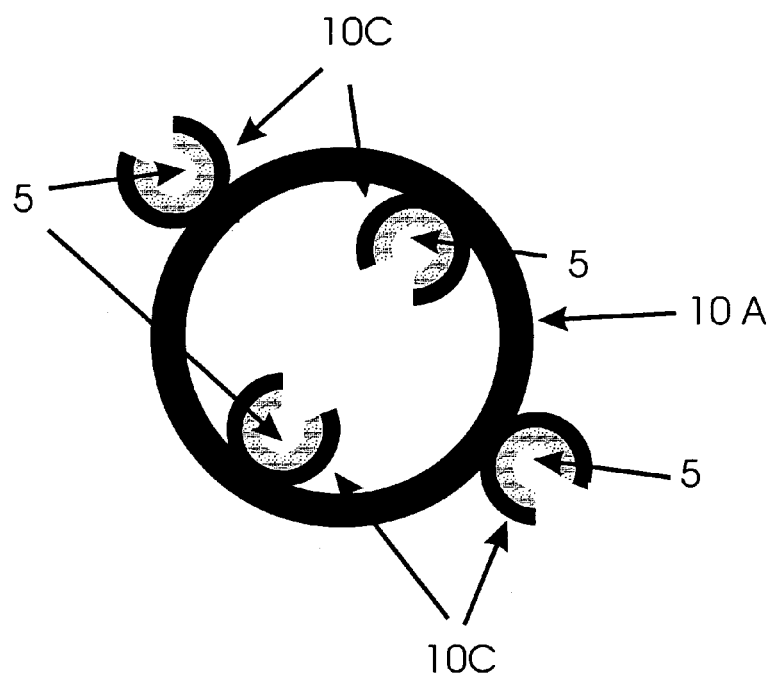

In FIG. 25, vapor 5 has been deposited on the interior wall of 10C which is located inside glass tube 10A. In FIG. 26 and FIG. 27, solute 7 is shown passing through 10A and 10C and 10H. Alternatively as shown, solute 7 may be passed only through glass tubes 10H. This can help prevention of deterioration of coating 5 if needed by limiting exposure to solute 7. The solute dissolves a part of the wall of 10c and/or 10H, which is soluble glass, leaving an opening between the interior of tube 10C and the interior of tube 10a. Ultrasound may be used as an aid in the dissolution process. The opening allows exposure of any contents of 10A to the coating 5 on the inside wall of 10C. Contents may include light or any medium or material passing through 10A. In one particular application, particular design/choice of dimensions may achieve transport of evanescent waves through 10A, with tube 10C serves as a track.

Figure 32:
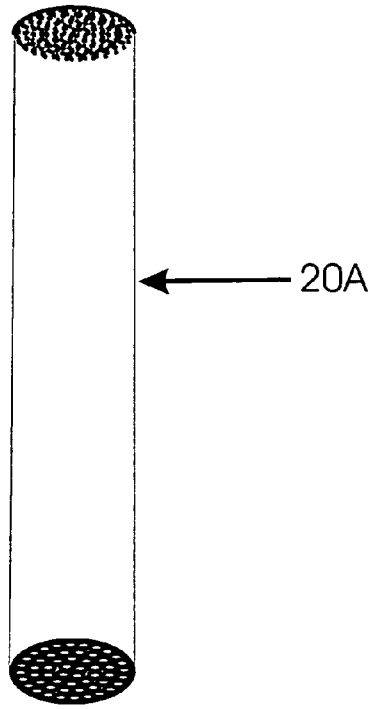
FIGS. 32-49 illustrate methods for making preforms, which can be better controlled and enable the making of smaller drawn preforms.
Figure 33:
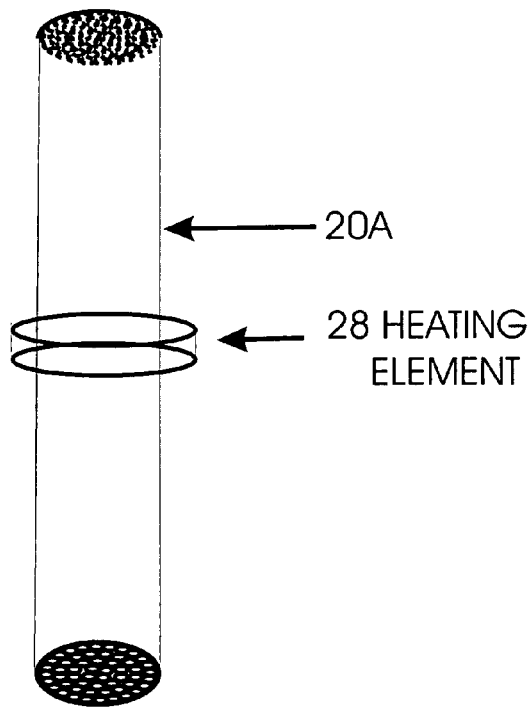
Figure 34:
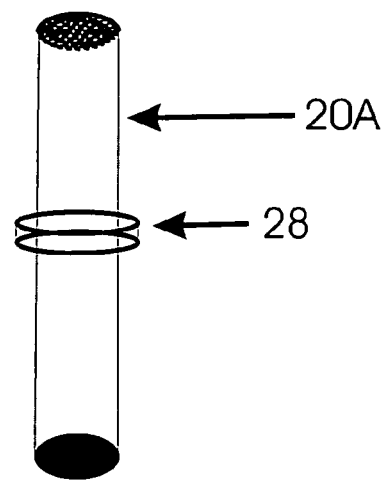
Figure 35:
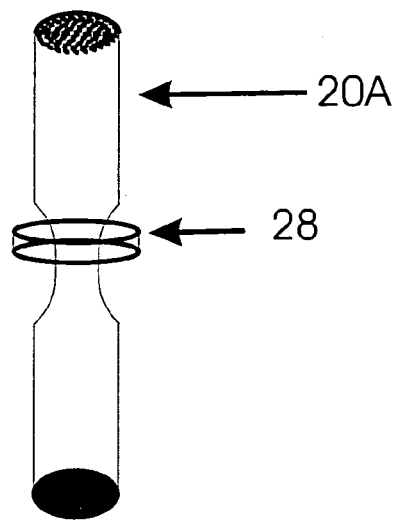
Figure 36:
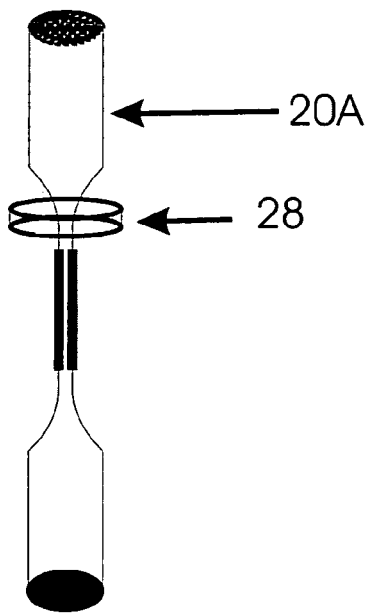
Figure 37:
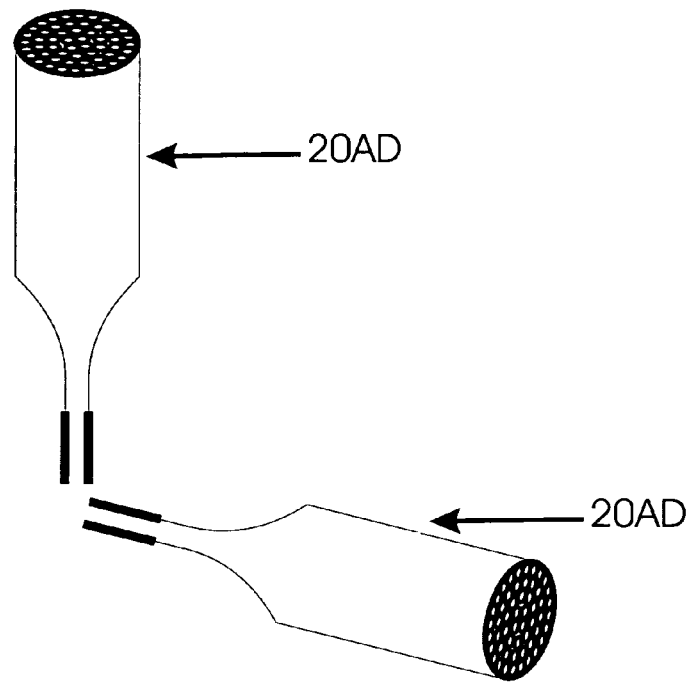
Figure 38:
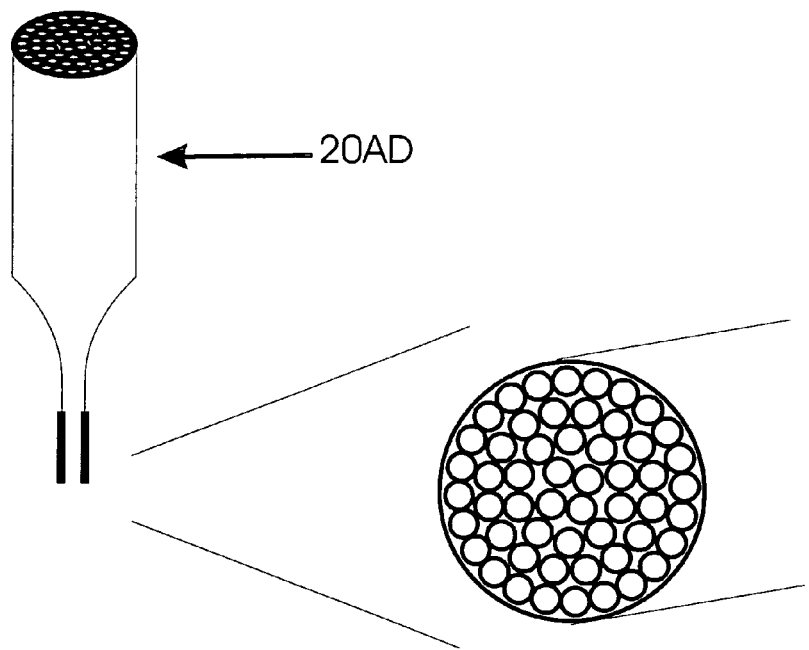

FIGS. 28 through 31 are examples of the many possible configurations 10A with 10C. FIG. 32 shows preform 20A. FIG. 33 shows preform 20A encircled at its midpoint by heating element 28. FIGS. 34 through 36 show preform 20A being heated and drawn. FIG. 37 shows the drawn preform 20A separated into two parts. FIG. 38 shows the end view of smaller drawn end of preform 20A. In one embodiment, the smaller drawn end can produce tubes in the range of nanometers, and specific examples with particular implementations can be tubes having dimensions less than about 1 micron or between about 1 and 500 nanometers, or between 10 and 100 nanometers, and some specific application embodiments the sizes can be about 20 nanometers in size.

Figure 39:
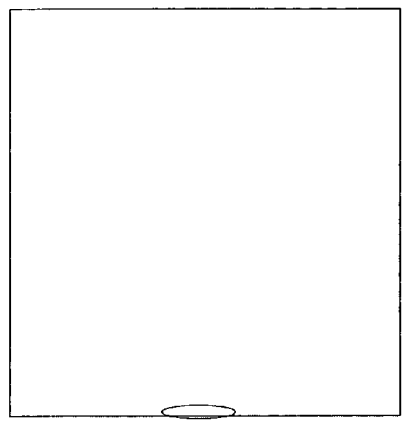
Figure 40:
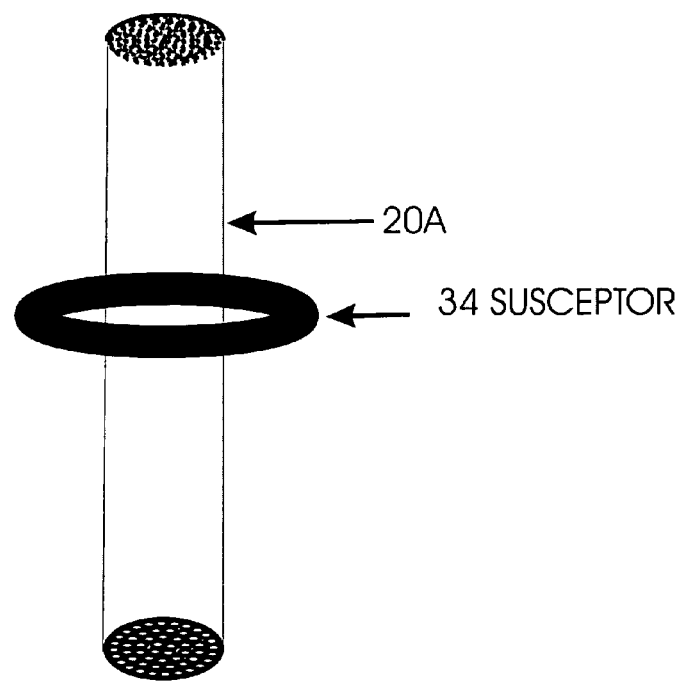
Figure 41:
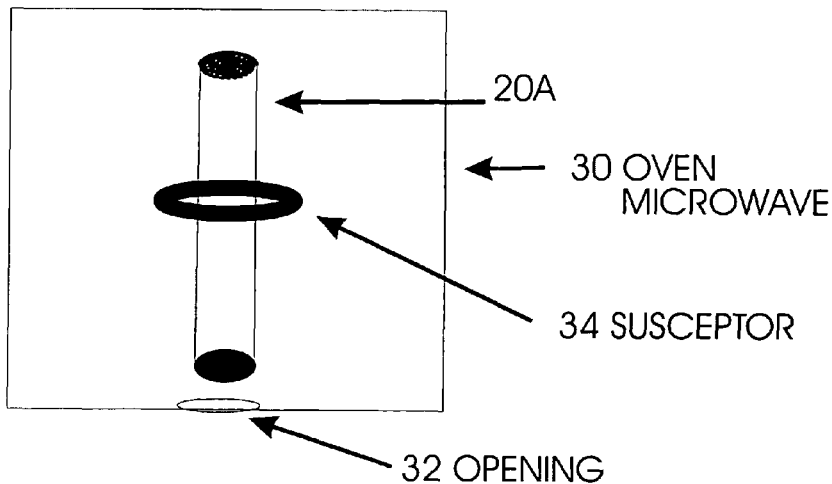
Figure 42:
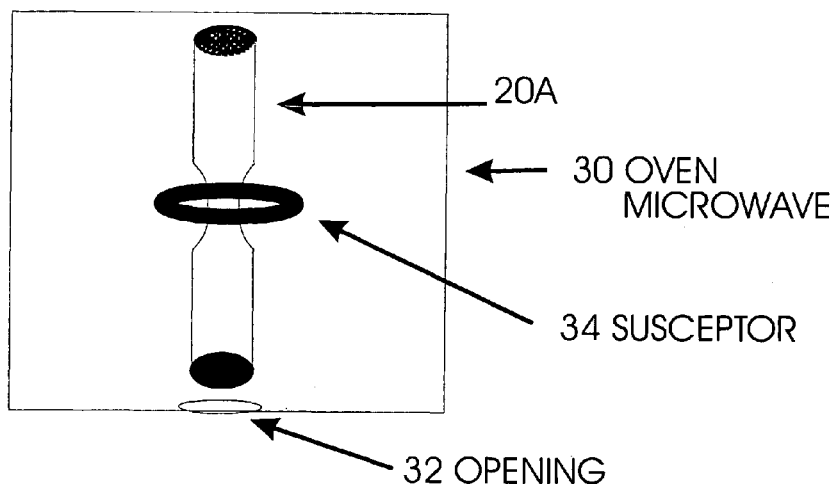
Figure 43:
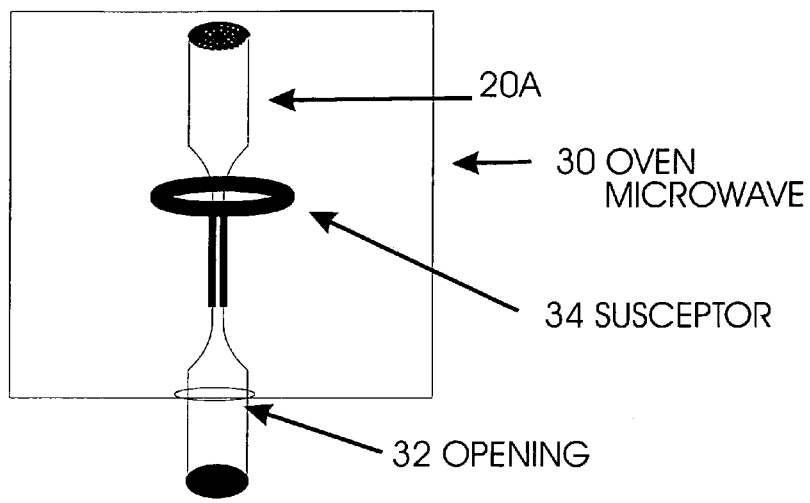
Figure 44:
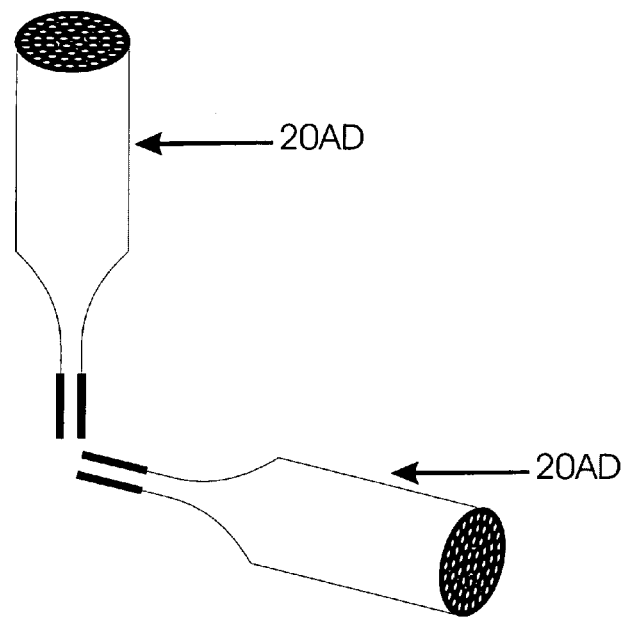
Figure 45:
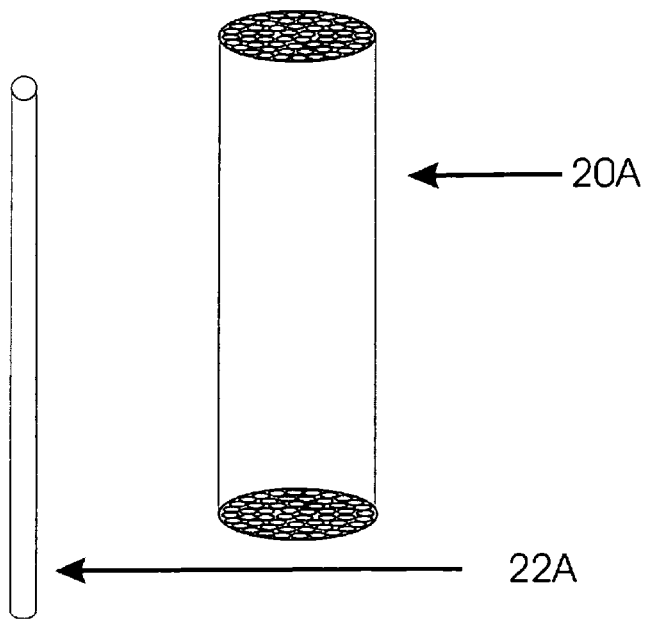
Figure 46:
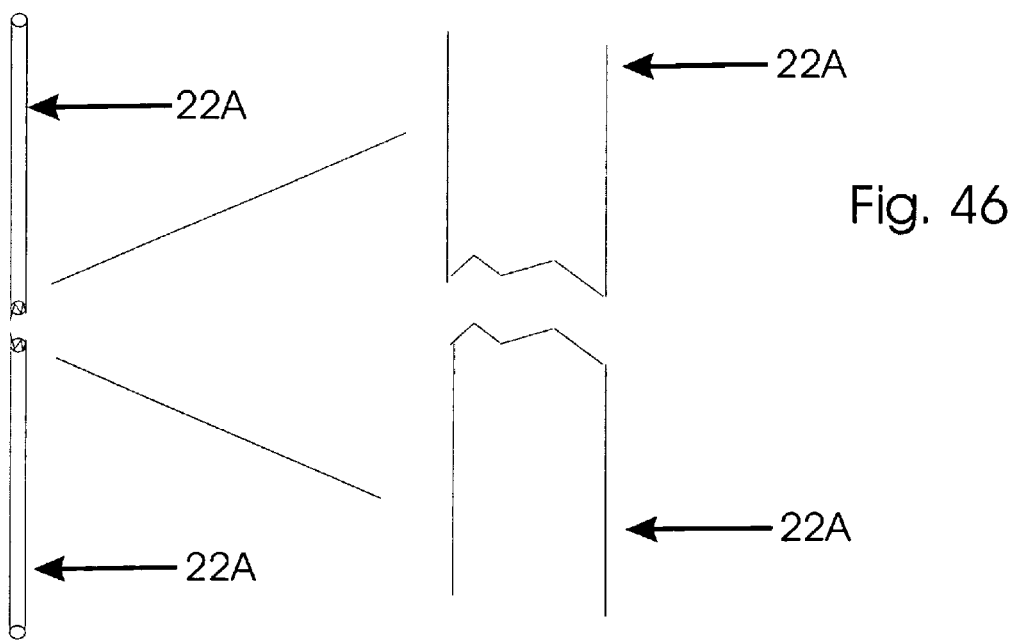
Figure 47:
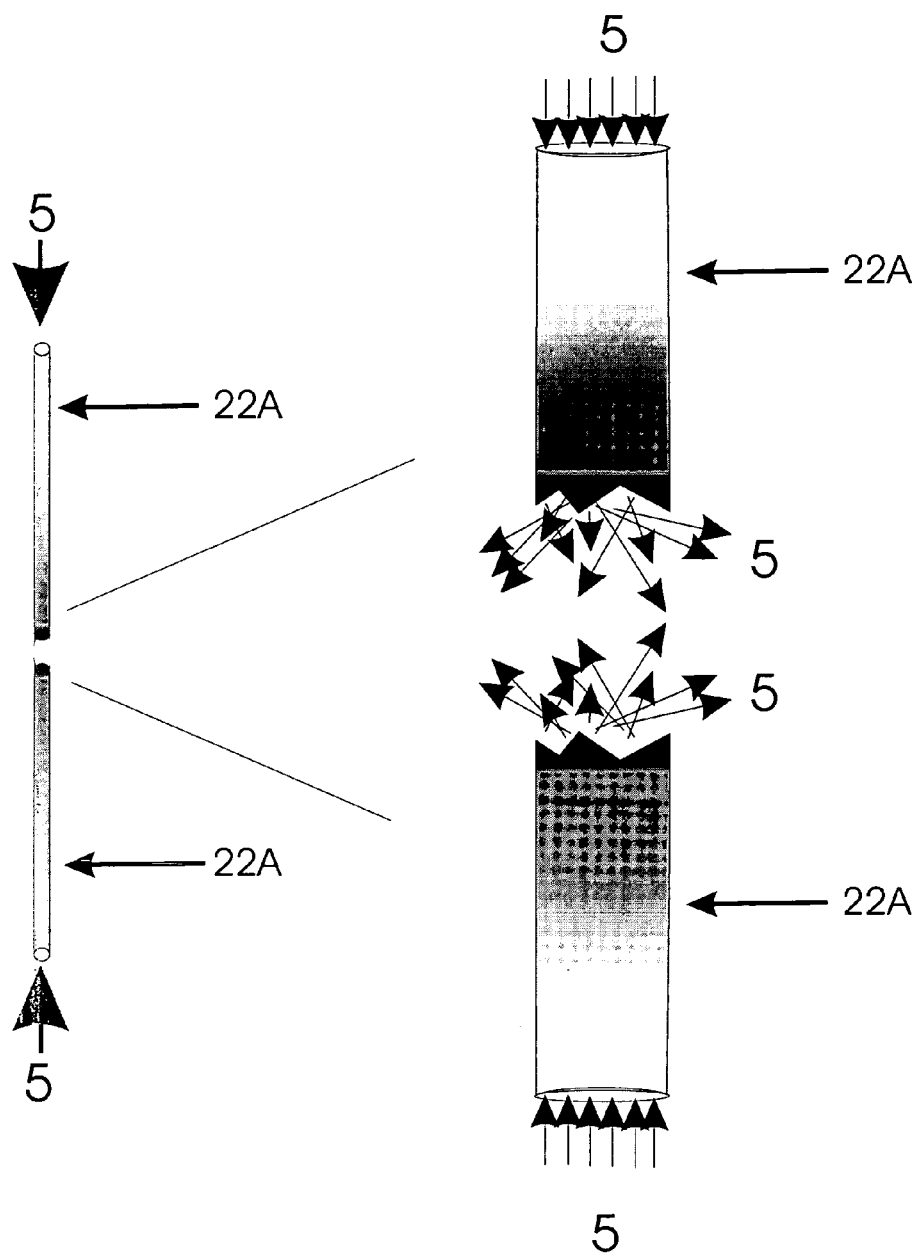

FIG. 39 shows a microwave oven, which can be used as another method of heating preform 20A to a "drawing" temperature. The drawing temperature is the temperature that enables the pulling apart of the perform. FIG. 40 shows a susceptor ring 34 in place around preform 20A. In this example, a susceptor is used in the microwave heating process. In FIGS. 41 through 43, preform 20A is shown being drawn using a microwave oven. Use of a microwave oven offers fine control of temperature and even heat distribution. This is especially useful when the preform consists of a large number of tubes, such as tens of thousands or hundreds of thousands.

Figure 48:
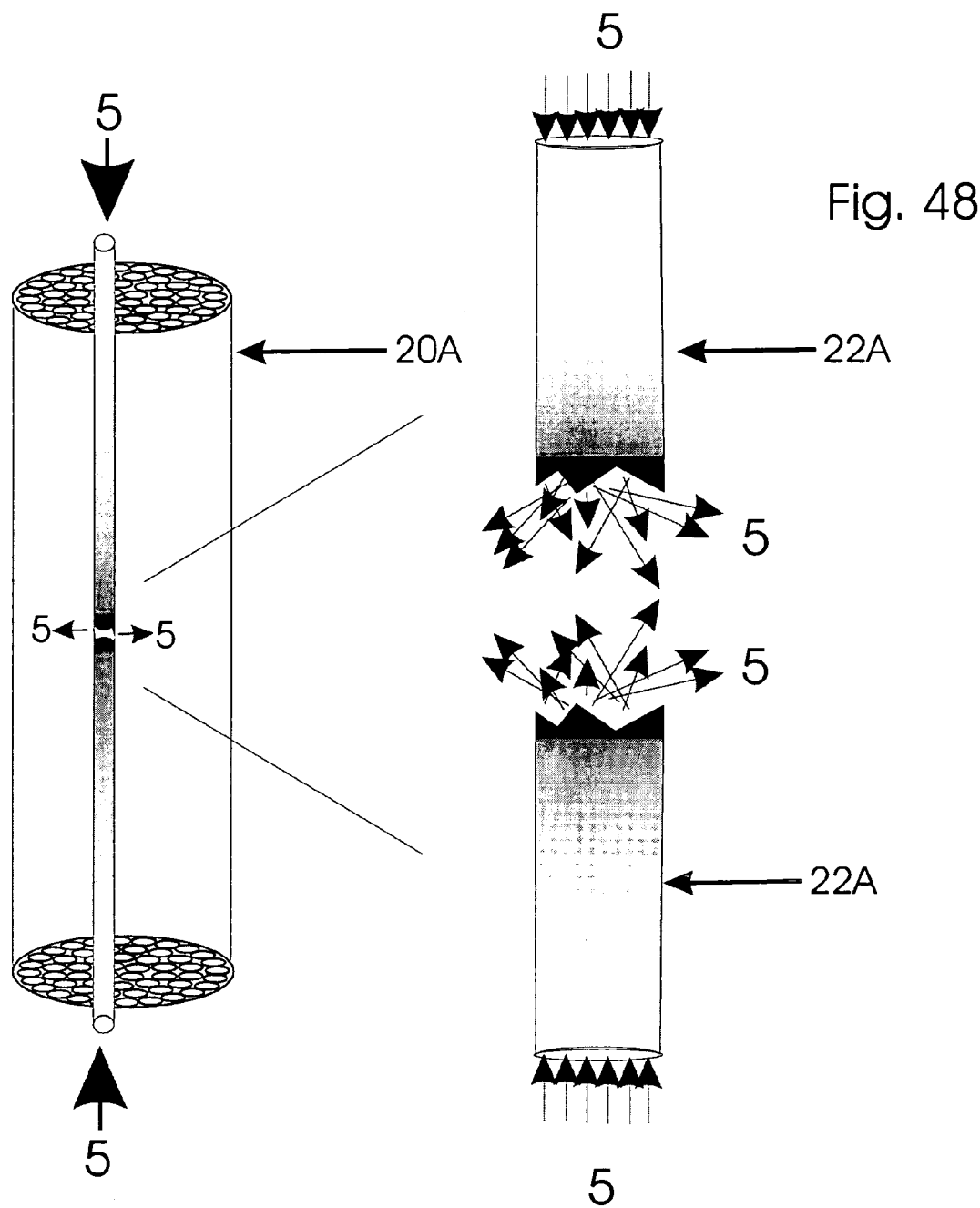
Figure 49:
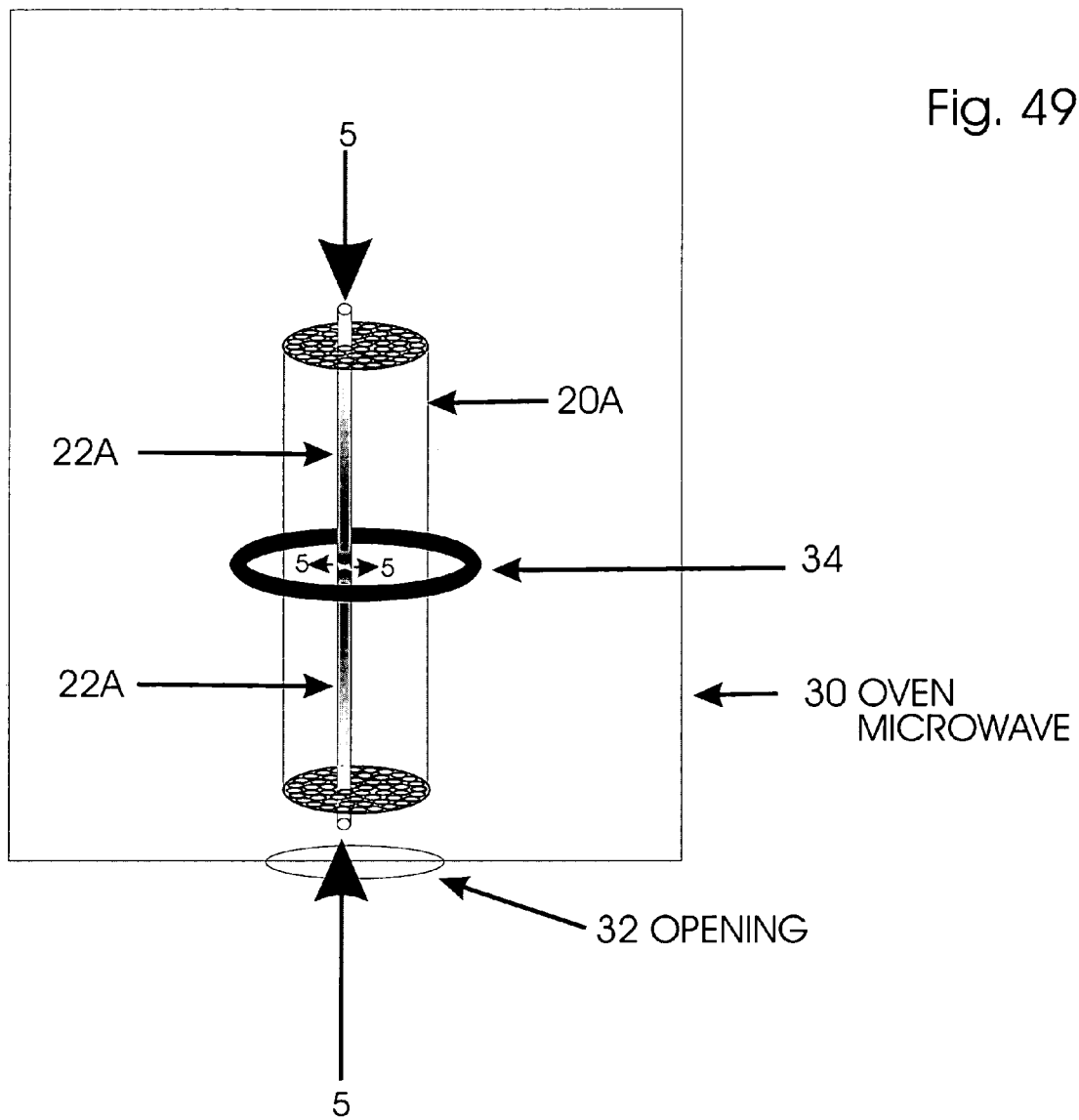

FIG. 48 shows placement of a short segment of rod 22A having a roughened end surface in the center of preform 20A. The roughened surface disperses infrared radiation that is directed down the rod in all directions at the center of preform 20A. This heat distribution helps heat the center of the preform to insure uniform heating of the draw zone which is that area encompassed by susceptor ring 34, as shown in FIG. 49.

Figure 50:
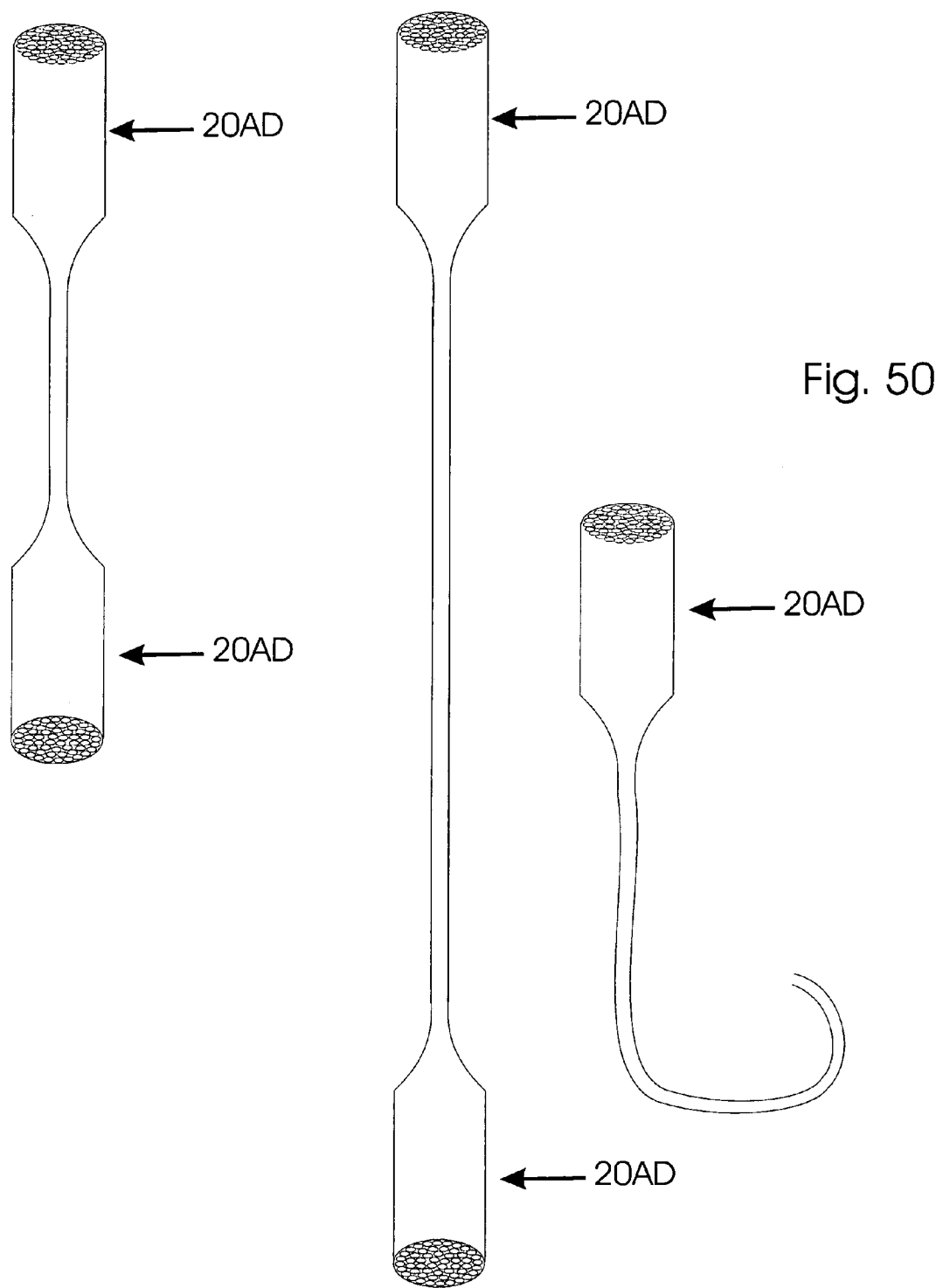
FIGS. 50-52 illustrate method for nesting drawn preforms, and drawing nested preforms.
Figure 51:
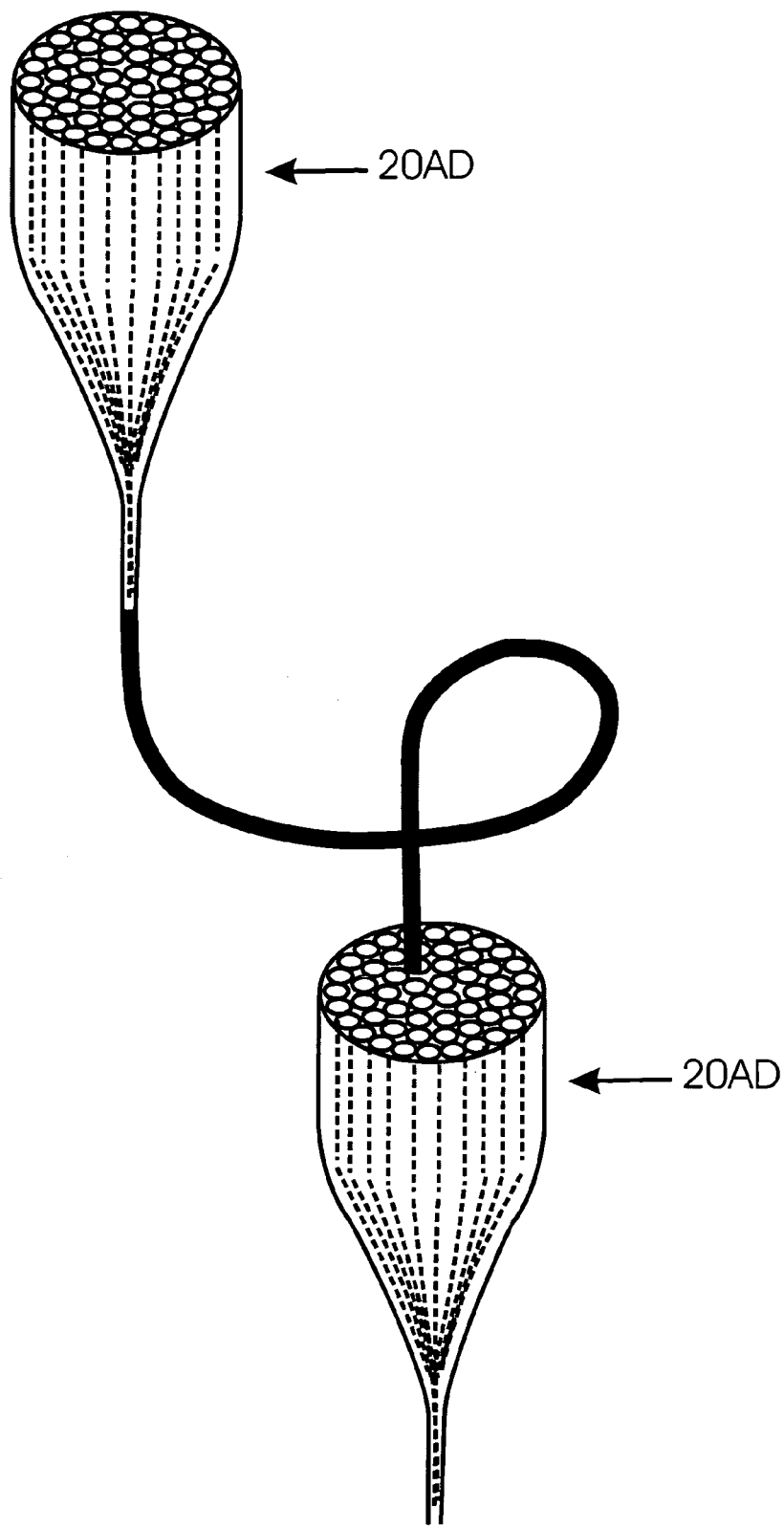
Figure 52:
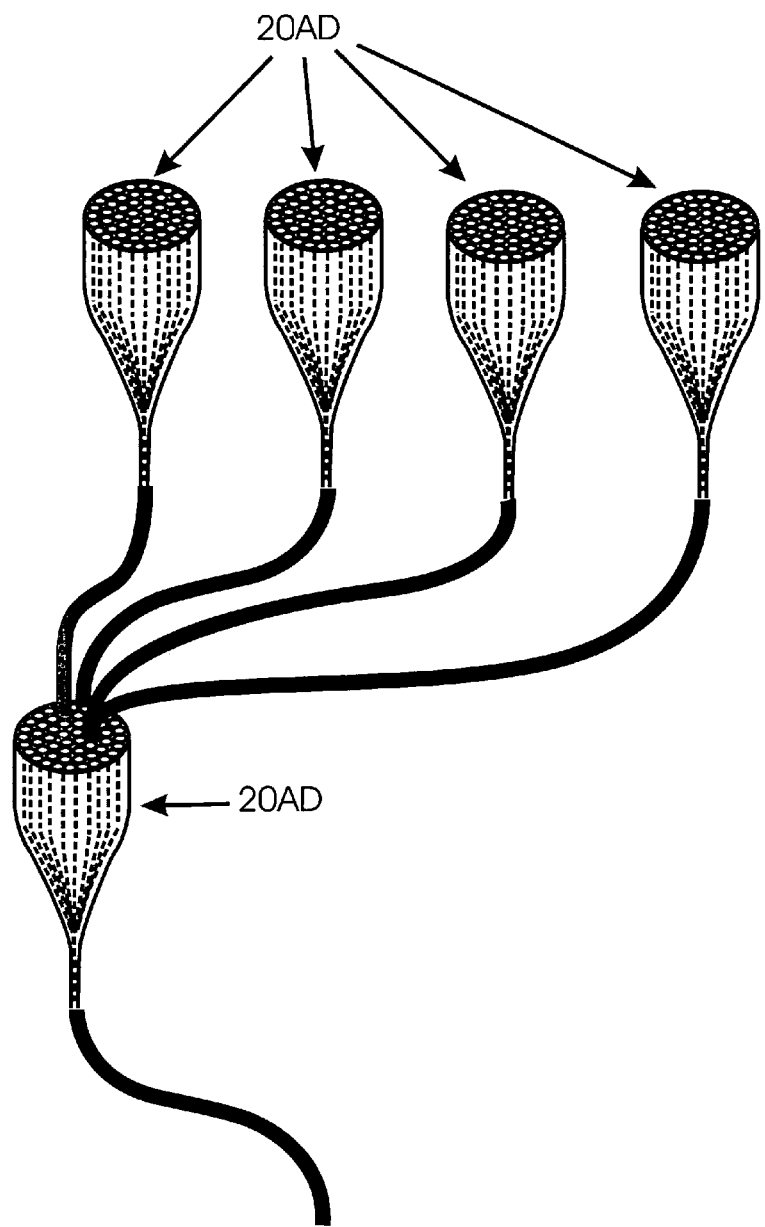
Figure 53:
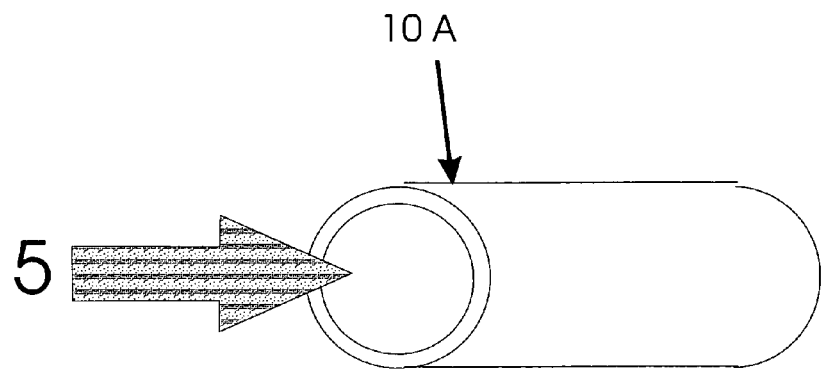
FIGS. 53-71 illustrate examples of using soluble tubes and non-soluble tubes with conductors, and affects that can be imparted on material samples while in the tubes.
Figure 54:
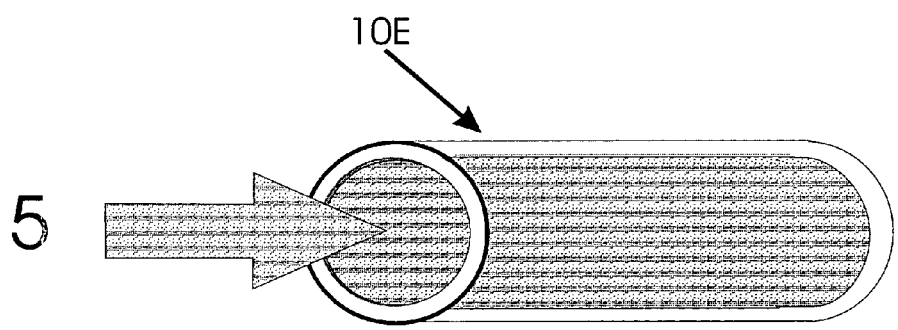
Figure 55:
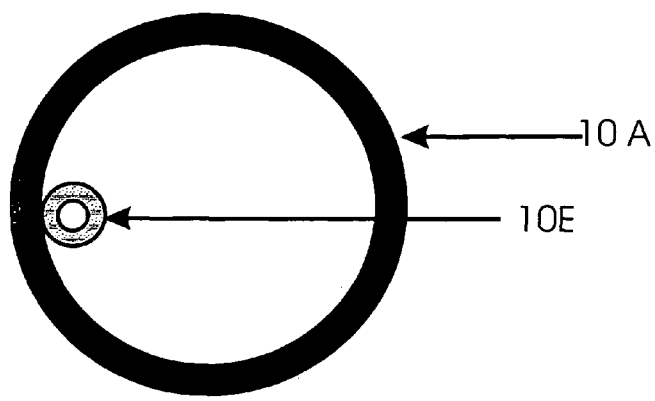
Figure 56:
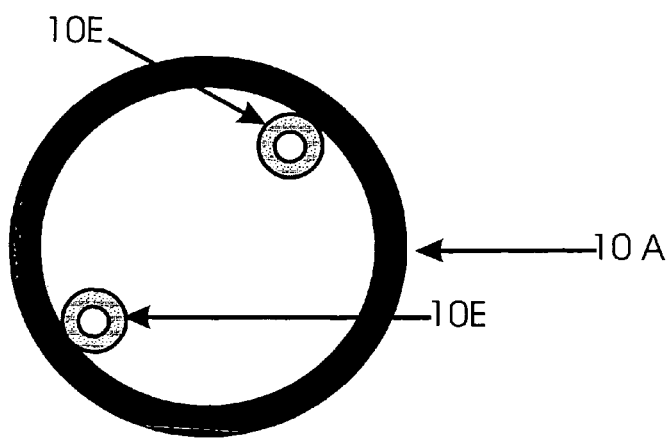
Figure 57:
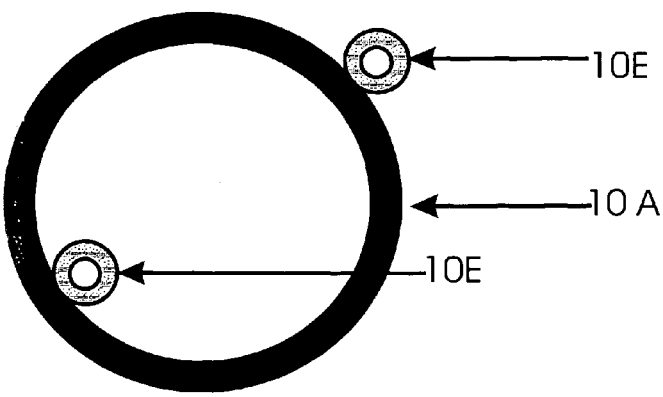
Figure 58:
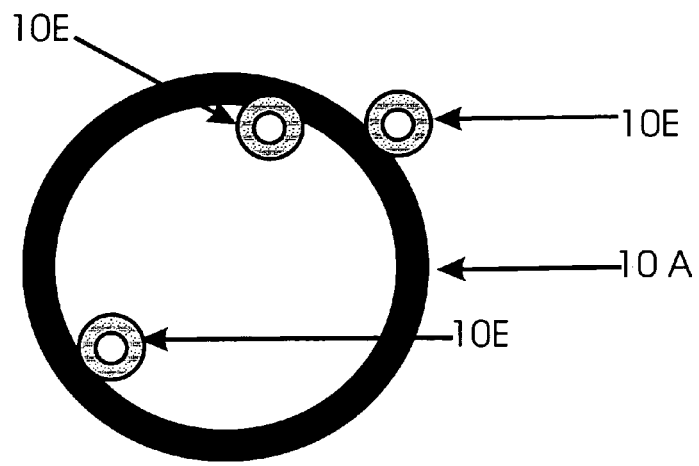
Figure 59:
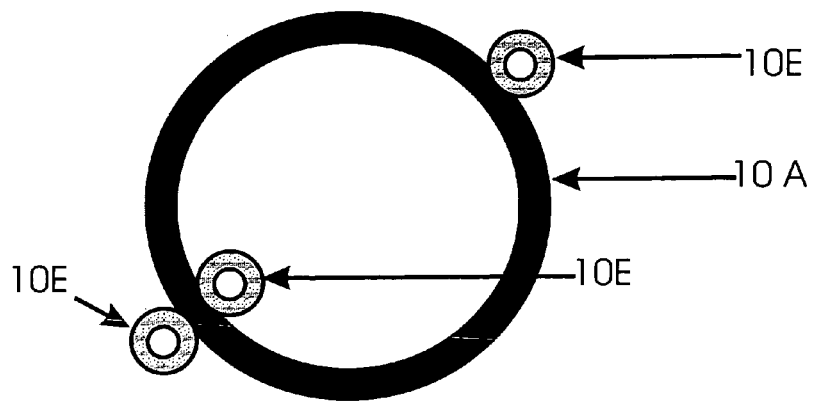
Figure 60:
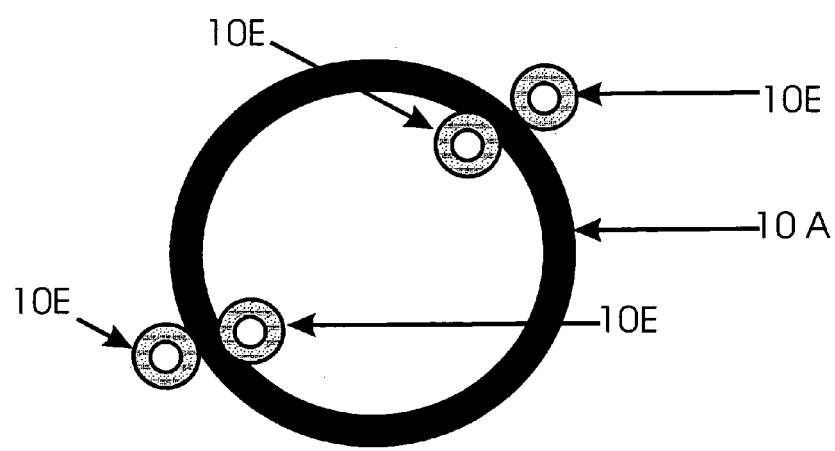
Figure 61:
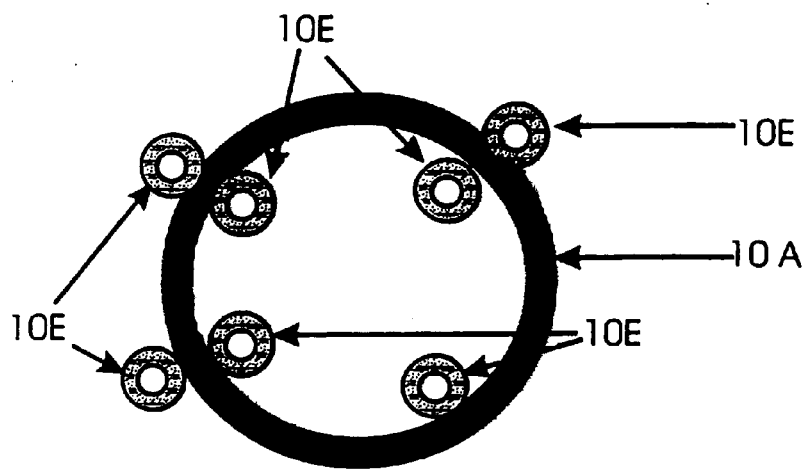
Figure 62:
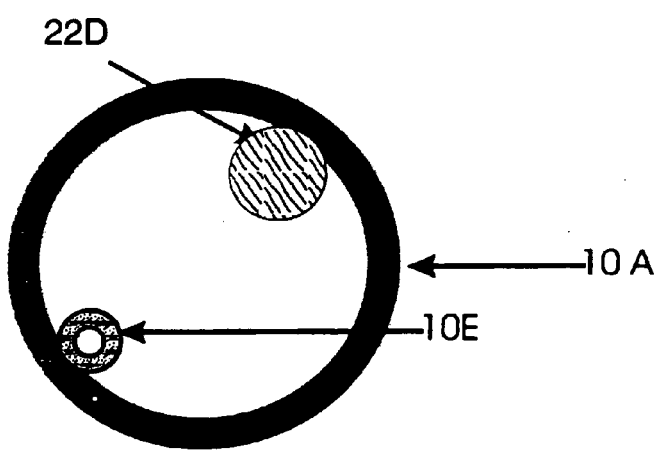
Figure 63:
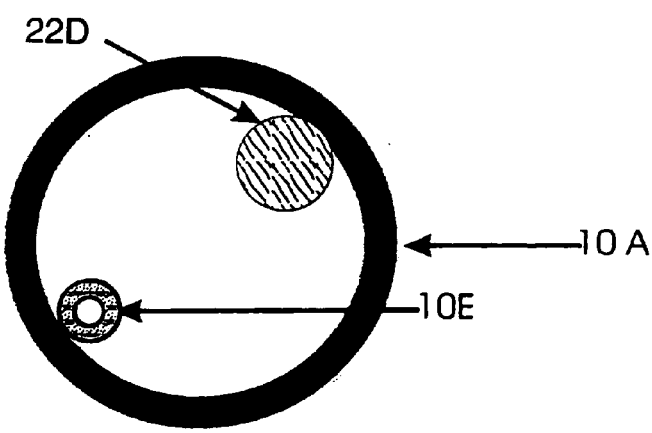
Figure 64:
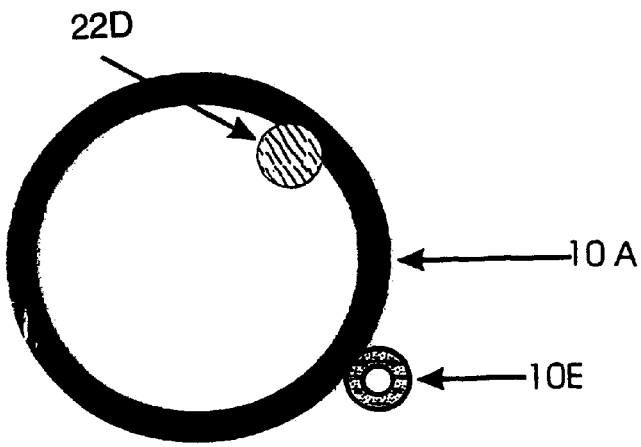
Figure 65:
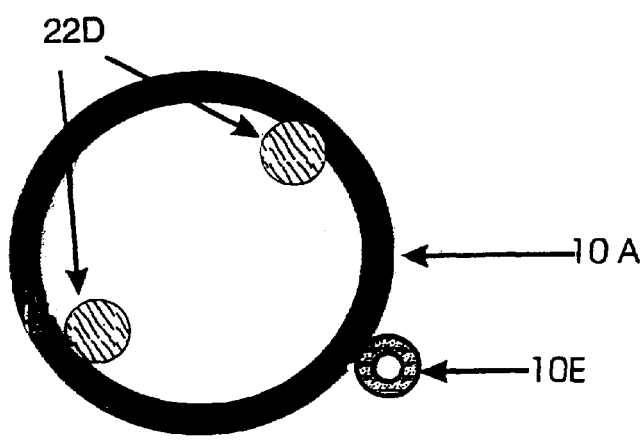
Figure 66:
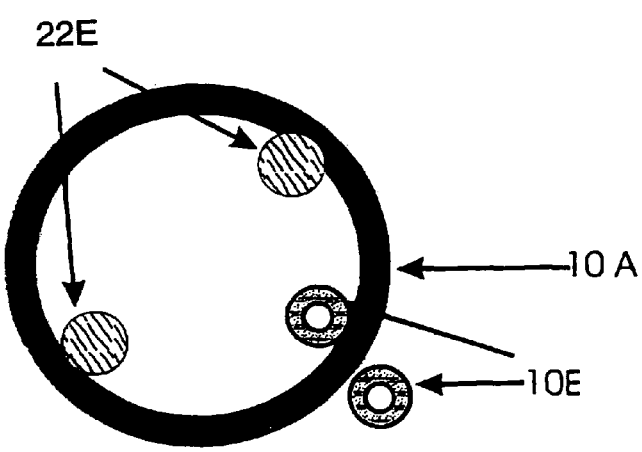
Figure 67:
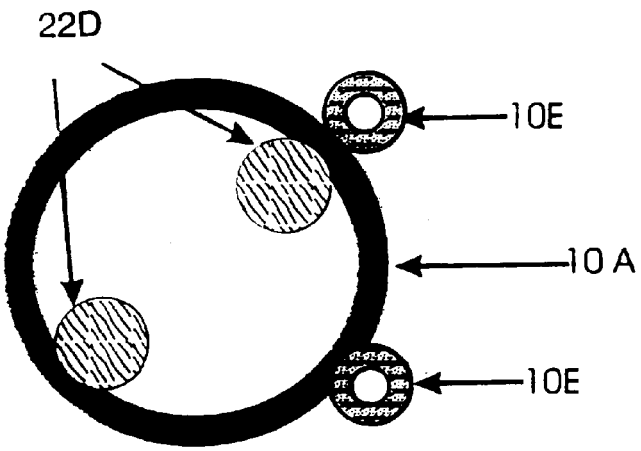
Figure 68:
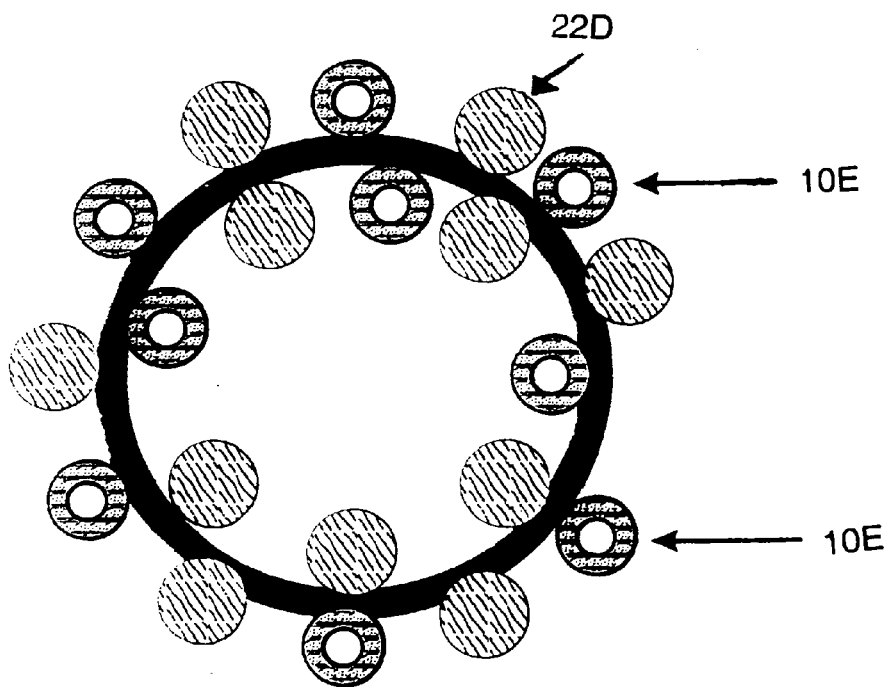

FIG. 50 shows preform 20A drawn with a long flexible end. This preform is designated 20AD. FIG. 51 shows the small end of preform 20AD incorporated in another preform 20AD. FIGS. 53 and 54 show tube 10A, being coated on its interior wall with vapor 5. In FIG. 54, tube 10a with an inside coating is designated 10E. In this embodiment, tube 10E may serve as an insulated conductor and may be used in combination with the various kinds of tubes and rods described here to make many preforms with many different applications. The tube is considered insulated, as the inside of the tube can be coated with a conductive material (by way of the vapor, for example), and the glass of the tube represents the insulating material.

Figure 69:
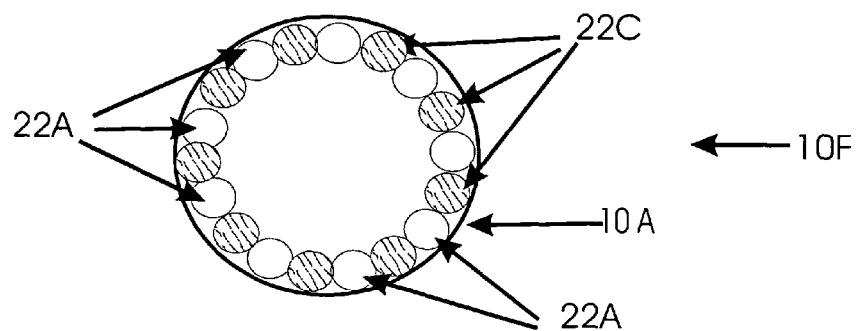

FIGS. 55 through 61 show some of many possible configurations of 10A with 10E. FIGS. 62 through 68 show some of the many possible configurations of 10A and 10E and 22C. FIG. 69 is the end view of tube 10F constructed from a tube 10A, which has its interior wall lined by alternating conducting rods 22C and non-conducting rods 22A, and leaving an open center in the tube.

In this embodiment, material having electric charge passing along the length of the tube 10F, may be made to circulate around the interior of tube 10F by application of pulsed sequential charge (or voltages) along tubes 22C as the material moves along the length of tube 10F. This circulation may be effective in mixing materials and/or in generating a shaped magnetic field in the material. The shaped magnetic field may be caused to interact with other magnetic field or fields to a useful purpose. Mixing, sorting, keeping molecules grouped, initiating chemical reactions, etc. can be facilitated by the application of the electric fields and associated magnetic fields.

Figure 70:
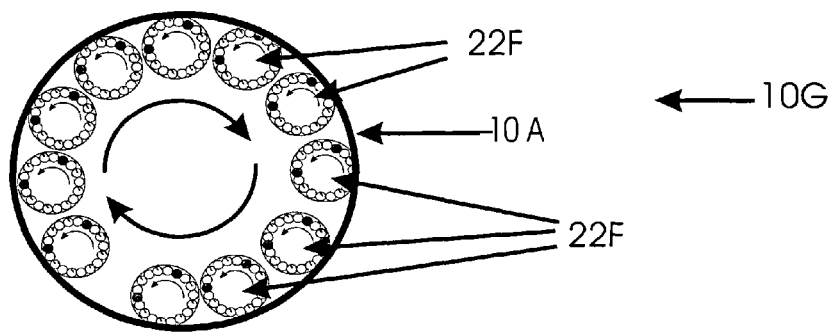

FIG. 70 is the end view of tube 10G constructed from a tube 10A, which has its interior wall lined with tubes 10F. The constructed tube is designated 10G. In this embodiment, tube 10G may be used for mixing materials introduced through the many tubes 10F. Rods and or tubes designed for transmitting light of different wavelengths along with optical fibers may be incorporated in the layout/design/plan of the preform.

In all these embodiments plus all other permutations and combinations of various tubes and rods of different sizes and compositions, are many unique embodiments. These embodiments may be useful for investigating and elucidating the internal structure, mechanisms of function, and mechanisms, chemical, electrical, and physical communications inside and between biological cells or live organisms.

The scale of some of the tubes may be in the tens of nanometers at the diameter in the probe end of the addressable assembly. In a specific example, the probe end can be a half micron to several microns. This size will be useful for research inside biological cells and in living systems. Numerous bio-probes may be used together to study individual cells and their relationships chemically, electrically, and physically, to one another in a living system/organism. The probe end can also be several microns to one hundred microns in diameter, in another embodiment. In other embodiments, the addressable assembly can be used to study the structure and physical, chemical and electrical, relationships of biological molecules individually and/or grouped/in concert/en masse/ amongst each other. The invention can be used to synthesize and or alter molecules in ways not possible in other than the nano dimension. One advantage of working in the nano dimension is that very large pressures can be applied and can be contained by tubing at this dimension. Also if a tube were to fail, the total energy is so small that there is complete safety to workers handling the devices of the present invention.

In one embodiment, the preform and bio-probe assembly is 1 to 2 meters in length. The assembly combined with manifold, metering devices, valves and hardware, and electronics may be approximately one cubic meter or more in volume. The size, of course, depends on the application. As such, the preform and/or bio-probe can be as small as one tenth of a cubic centimeter or larger, depending on the application.

Current patch clamps have dimensions in the microns. An embodiment of this bio-probe invention can be a probe with a one micron diameter consisting of 1600 twenty nanometer diameter addressable tubes.

The two small ends of the two matching performs, when registered and separated a small distance, tens to hundreds of nanometers make a nano-laboratory for investigation of DNA structure and physical properties. A DNA molecule can be positioned at the opening of a tube. Electrostatic attraction can guide the end of the DNA molecule to the opening of a tube on the opposite side of the gap. The DNA mol. can be further positioned with electrostatic attraction. Organic molecules can be positioned to interact with sites on the DNA mol. The topological structure of the DNA mol. may also be investigated by introduction of various marking or tagging molecules. The probe may have an optical fiber large enough to pass light interspersed within the assembly of rods and tubes in the probe. An outer shell tube may encase the probe. Evanescent waves may be detected by rod and or tube tips shaped and coated with gold to detect evanescent waves.

In one embodiment, an evanescent wave is a wave that decays exponentially with distance. Evanescent waves are observed in total internal reflection. The effect has been used to exert radiation pressure on small particles in order to trap them for experimentation, or to cool them to very low temperatures, and to illuminate very small objects such as biological cells for microscopy (as in the total internal reflection fluorescence microscope). In one embodiment, the evanescent wave from an optical fiber can be used in a gas sensor. In optics, evanescent waves are formed when sinusoidal waves are (internally) reflected off an interface at an angle greater than the critical angle so that total internal reflection occurs. The physical explanation for their existence is that the electric and magnetic fields cannot be discontinuous at a boundary, as would be the case if there were no evanescent field.

Figure 71:
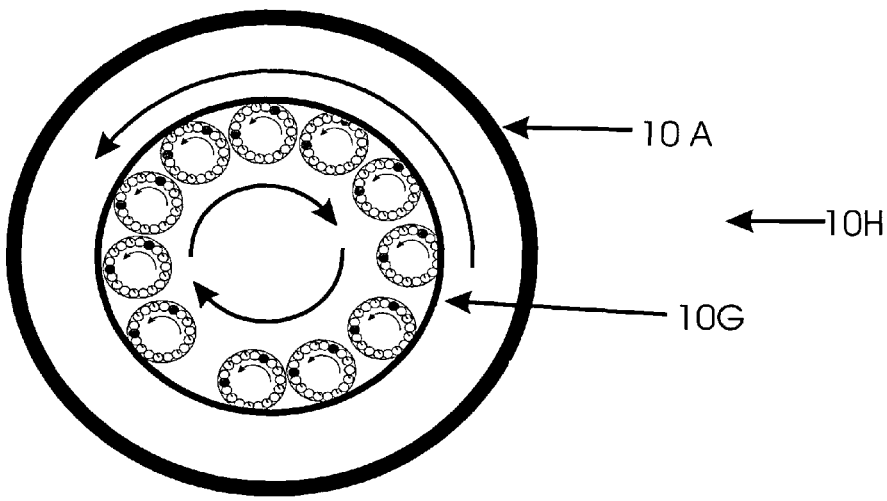

In FIGS. 71 and 72, rods 22C are shown being dissolved. The rods 22C serve as supports inside tube 10A for rod 22A. They stop rod 22A from fusing to tube 10A during the drawing process and may be dissolved to leave rod 22A free to move inside tube 10A. Rod 22a may have a different coefficient of thermal expansion than that of tube 10A. This will cause a difference in length between rod 22A and tube 10A with any change in temperature they experience. Therefore, if in a process of mixing different compounds one of which is flowing from tube 10A, heat or cold is generated, rod 22A may lengthen or shorten. If it has a higher or lower respectively, coe. of thermal expansion than tube 10A, it will block or enlarge the flow to tube 10A, limiting or increasing the flow from tube 10A and consequently slowing the heat or cold generating process. The reverse is also true.

In the embodiment shown in FIG. 73, rows of tubes 10A are interspersed with rows of sacrificial soluble rods 22C. There is also a large tube 10AL. The rods 22AC are dissolved leaving passages or grooves on the surface formed by the cross section array. The width of the path is determined by the diameter of the soluble rods 22C. Pathways may be made in any configuration desired. The diameter of the large tube may be any dimension convenient for dispersal of any particular DNA molecule or material. For example, the second large tube 10AL in this embodiment may receive an end of the DNA molecule to be examined. By varying the attractive force in each tube 10AL, the DNA molecule may be moved back and forth along the connecting pathway. Tubes and rods along the length of the molecule in the channel may be used to supply interacting substances or forces to specific locations along the DNA molecule. Substances may be ferrites, flourophores etc. After the tubes or rods have been dissolved they may be sequestered/isolated with a layer of epoxy or pitch or any material which will suit.

Figure 74:
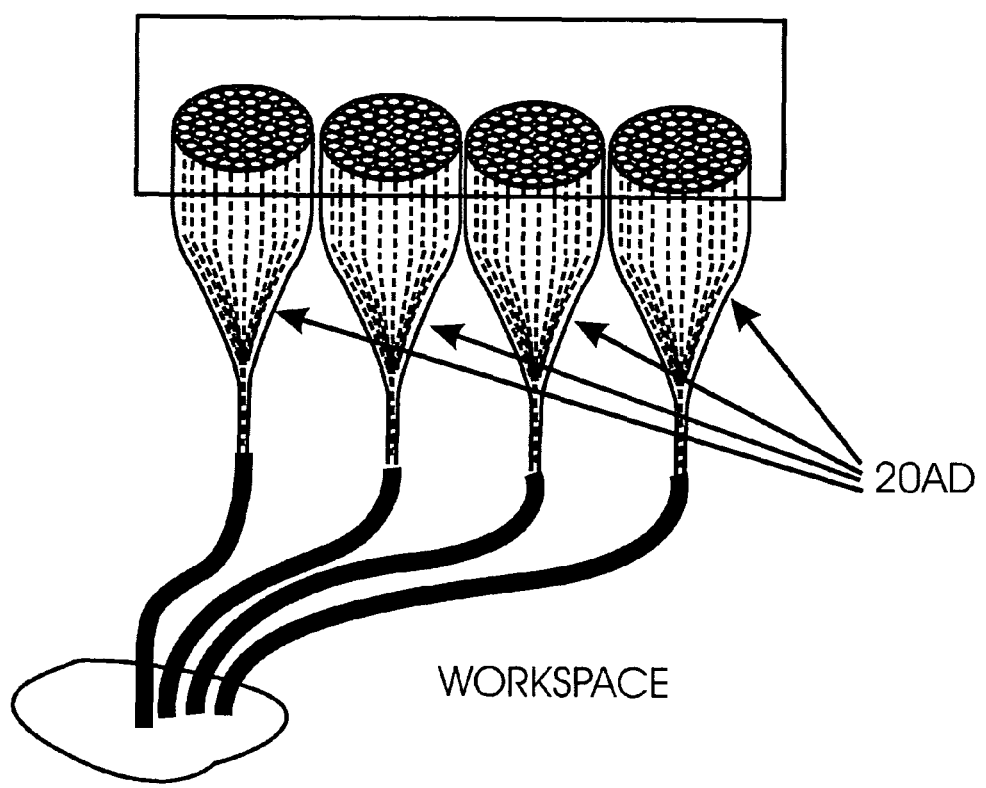
Figure 75:
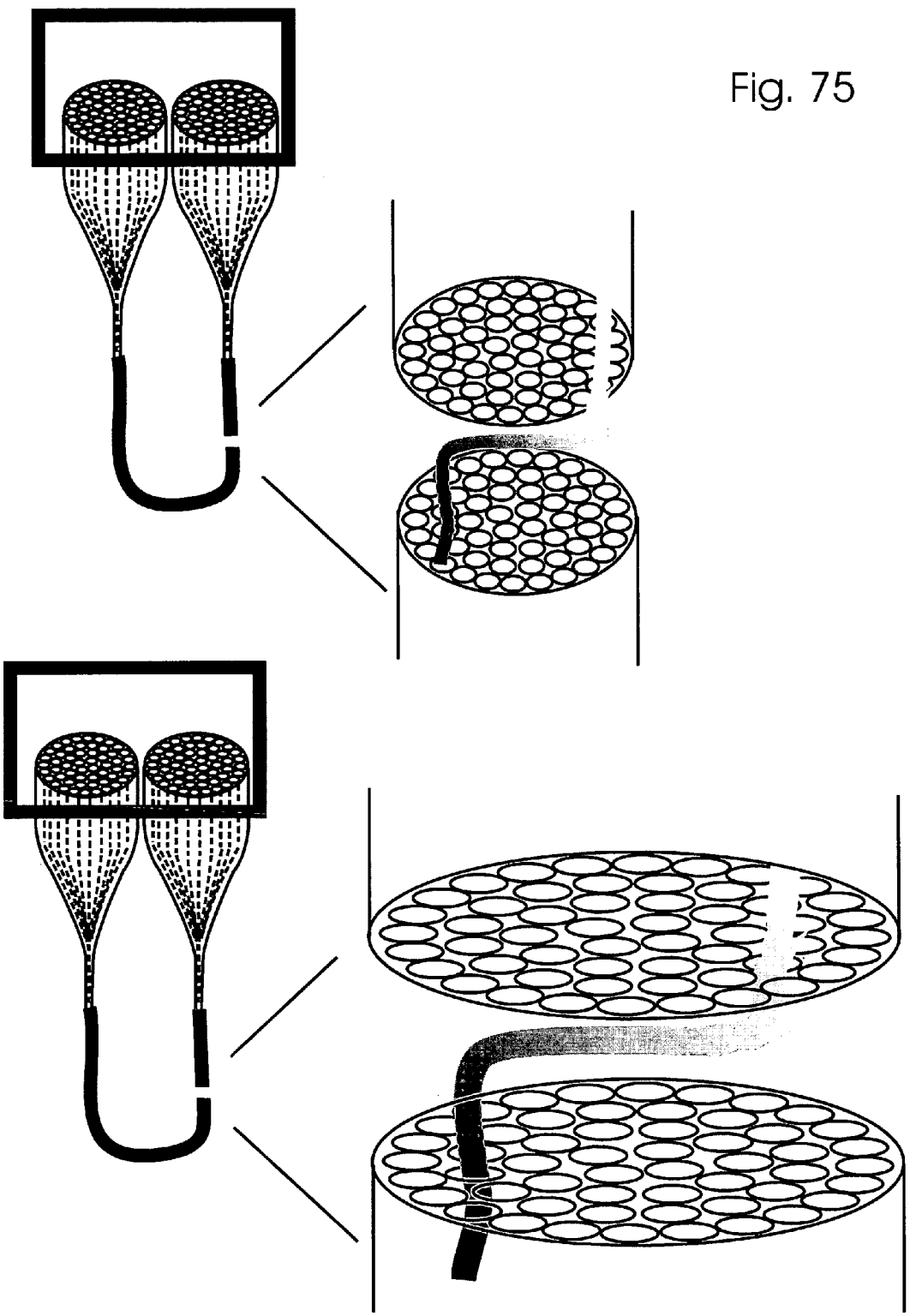

FIG. 74 is an example of several bio-probes, which can be used together with a single manifold. The probe end is free to be placed wherever necessary in the workspace 38. FIG. 75 shows an example of the configuration of two matched bio-probes, in which the faces of the bio-probes are opposite each other and in close proximity. This distance is controlled by a mechanism in the workspace. DNA molecules may extend from a tube in one bio-probe across the gap 40 into a tube in the other bio-probe. The position of the DNA mol. can be controlled by manipulation of charge in each bio-probe. Observation of the DNA molecule can be aided by deposition of flourophores etc. at specific sites applications from various tubes at the bio-probe surface. Also, the topology of foldings and coilings of the DNA mol. may be determined from accumulation and analysis of data from various interactions with the bio-probes.

Figure 76:
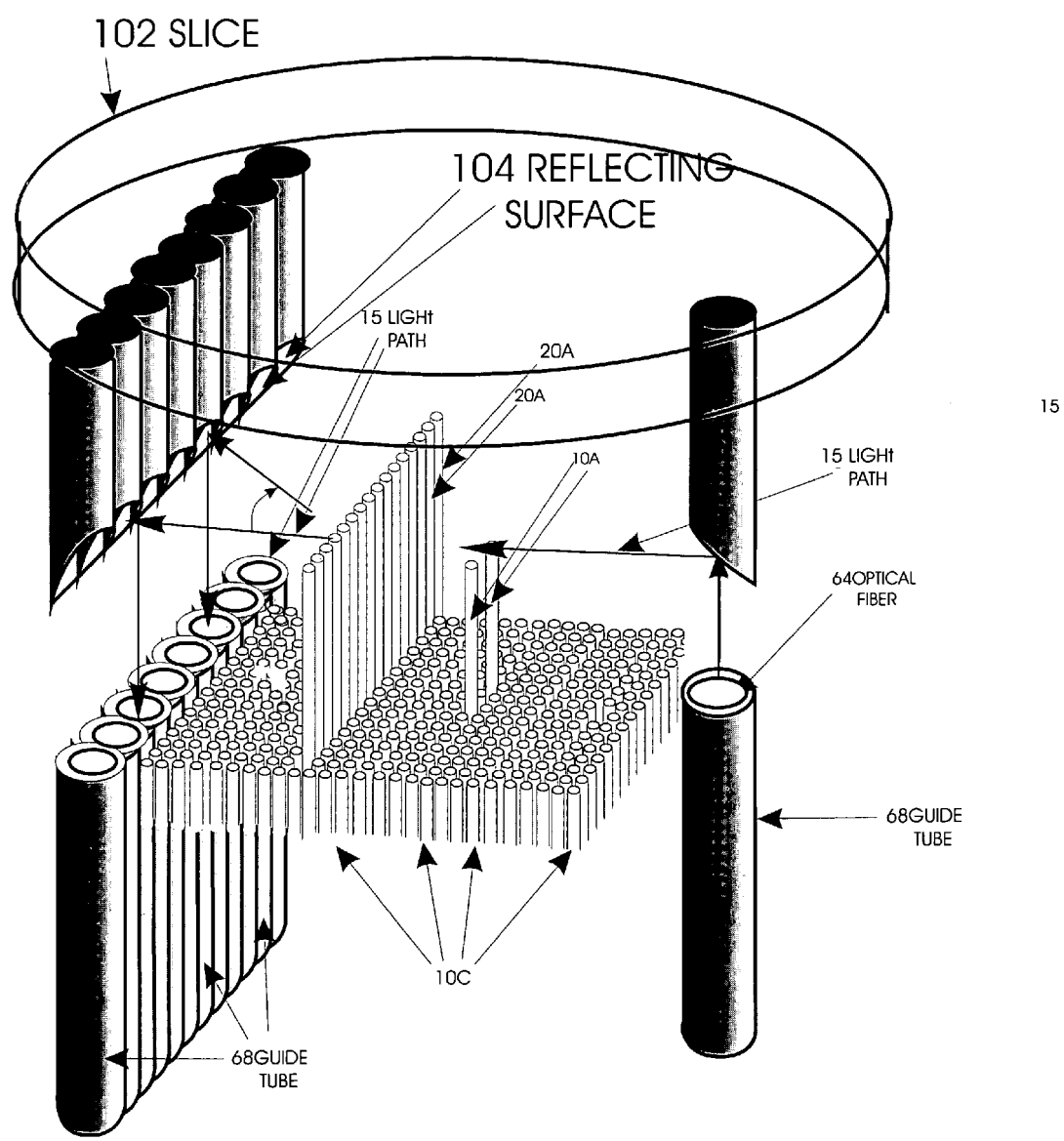
FIGS. 76-80 illustrate method and structures that can be built from a plurality of tubes, when the tubes are provided with reflecting surfaces or extended beyond different planes, and the conduction of optics, fibers optics, light, and fluids therein.

In the embodiment shown in FIG. 76 guide tubes are secured adjacent to the array face. In this embodiment optical fibers are placed in the guide tubes 68. Above the guide tubes array slice 102 is positioned parallel to and a specified distance from array face 20AD by means of optical and or physical registration with array face 20 AD. In this example the separation distance is two to fifty microns. In FIG. 76 the array face 20AD is shown only in part. In this example array face 20 AD has a number of tubes 10A or rods 20A arranged in a straight line extending from array face 20 AD and normal to array face 20AD. The row of tubes 10A or rods 20 A is a diffraction grating. The row of optical fibers receive the resulting light.

Figure 77:
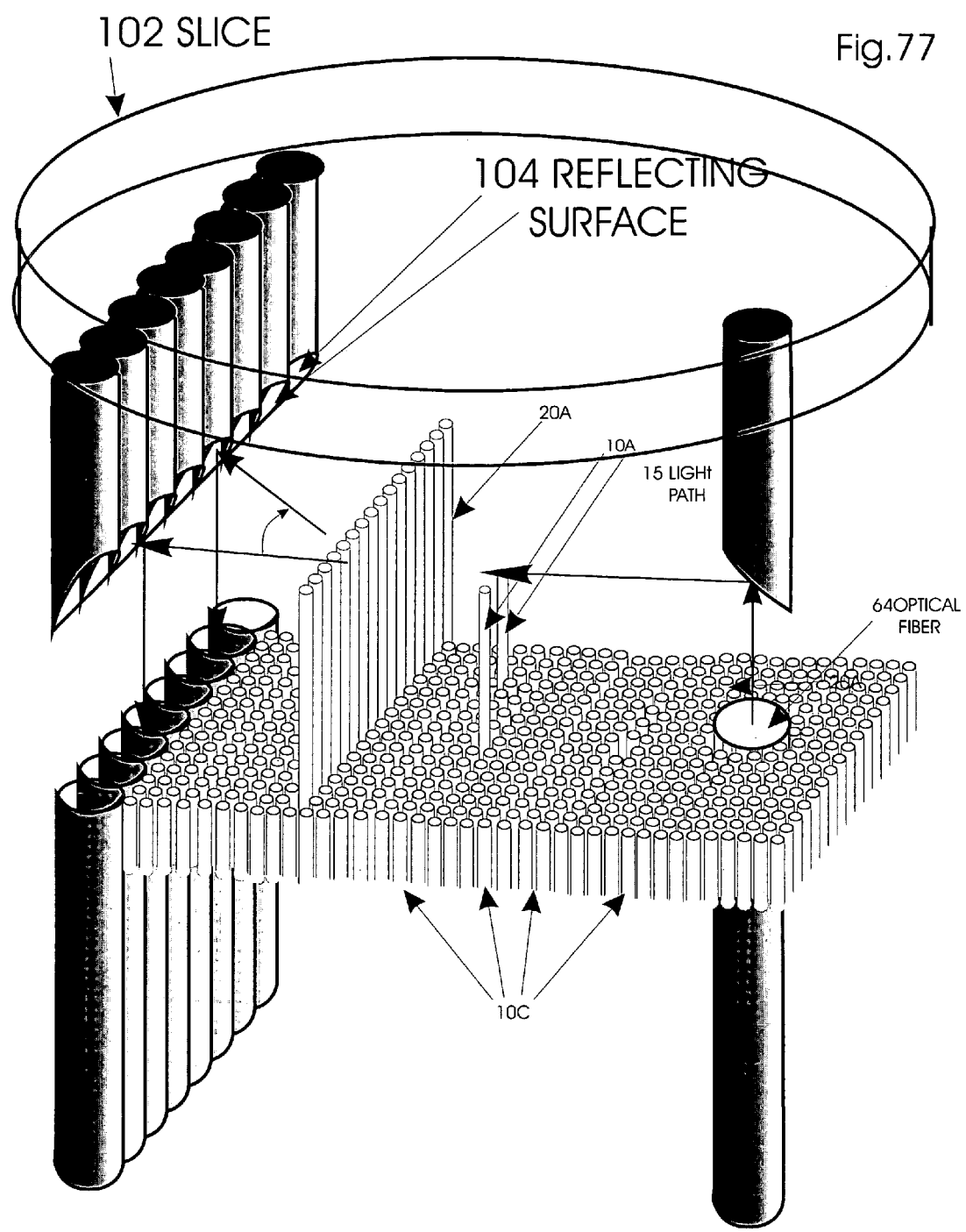
Figure 78:
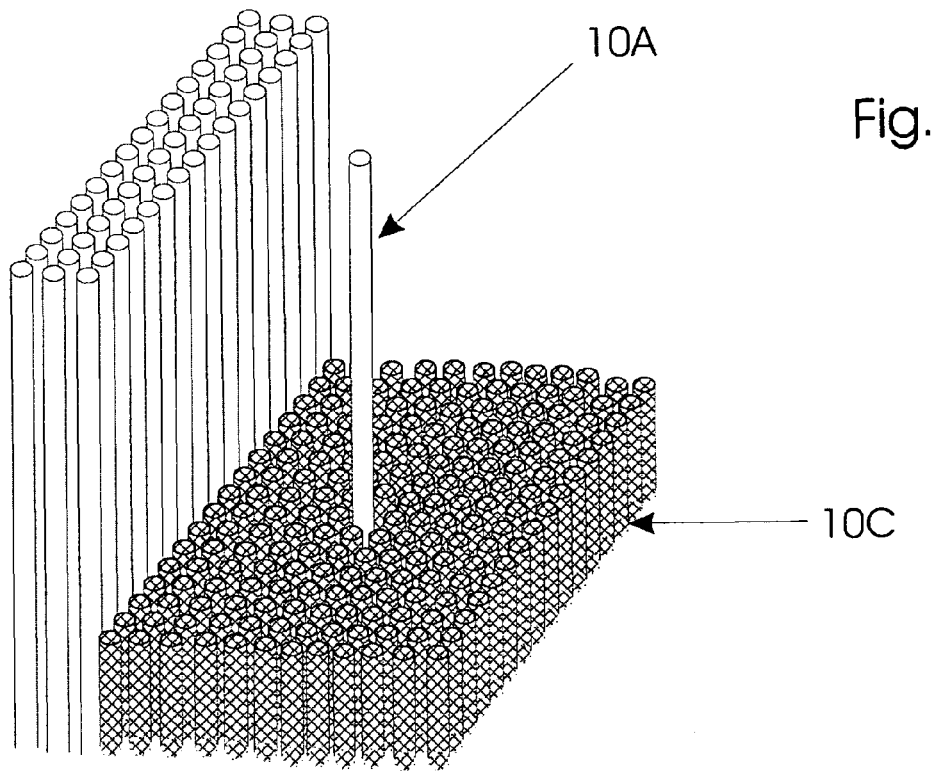
Figure 79:
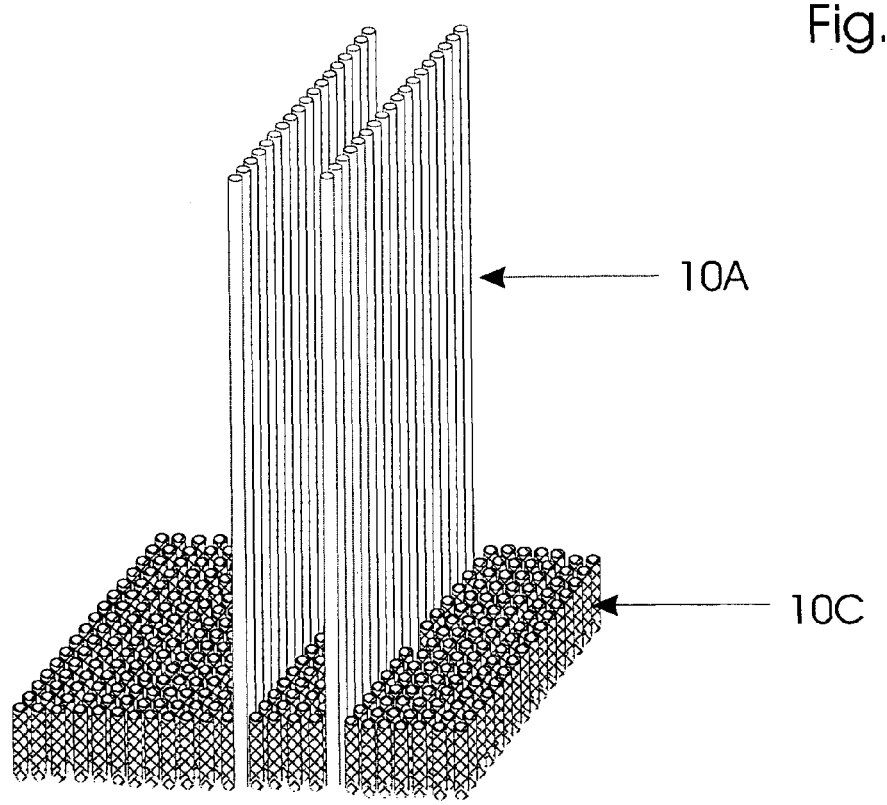

In the embodiment shown in FIG. 77 the difference from the embodiment shown in FIG. 76 is that the optical fiber is a part of the array LOAD.

Figure 80:
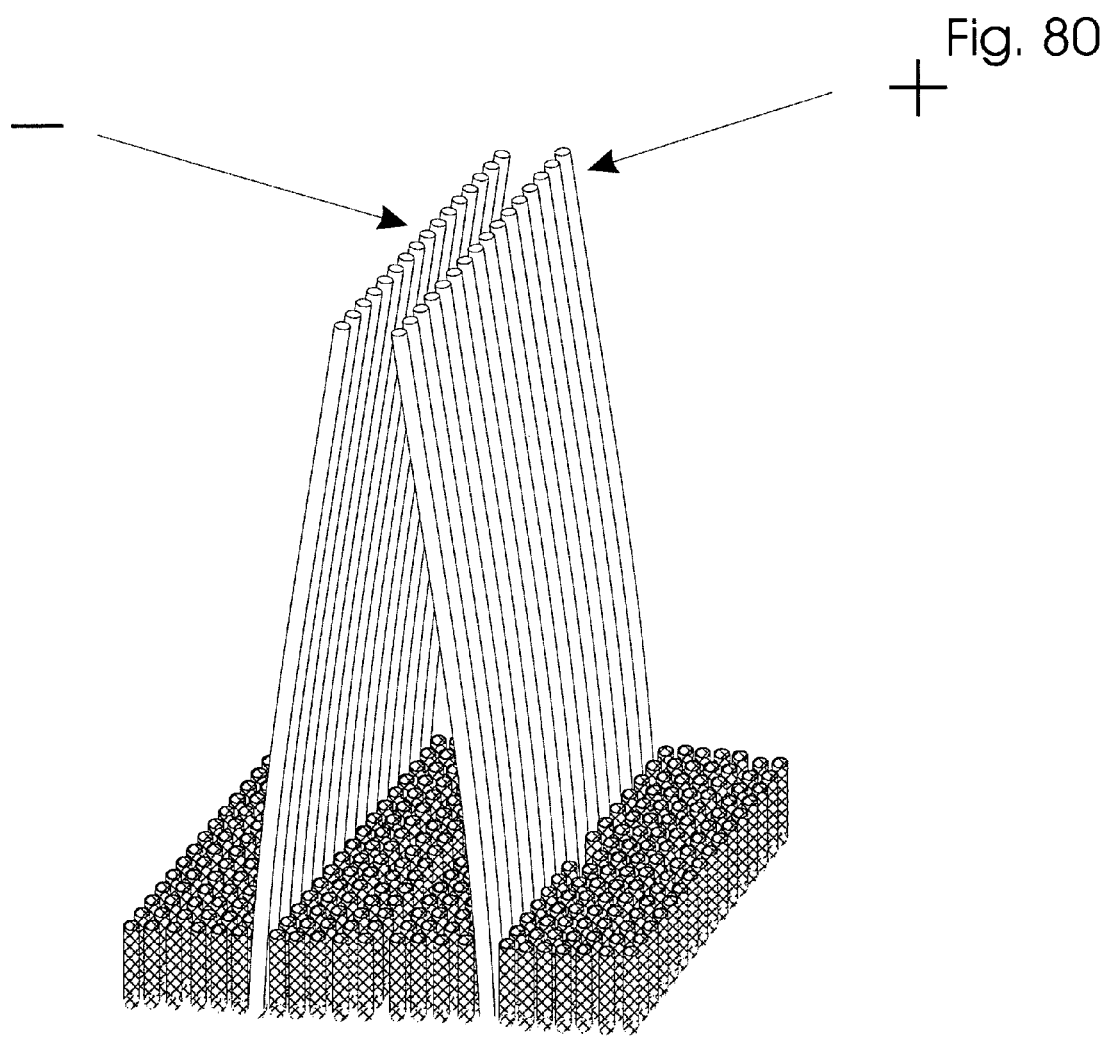

FIG. 80 is the embodiment of a segment of an array face whose arrangement of soluble and insoluble tubes has yielded, after dissolving away from the array face the soluble tubes two parallel rows of tubes. In this embodiment, the dimensions of the tubes in the parallel rows are such that application of an opposite charge to each row bends the rows toward each other, in effect making a tweezing action. Which can be utilized to hold some item. Additionally, the rows of tubes can be made to move independently or in unison.

Figure 81:
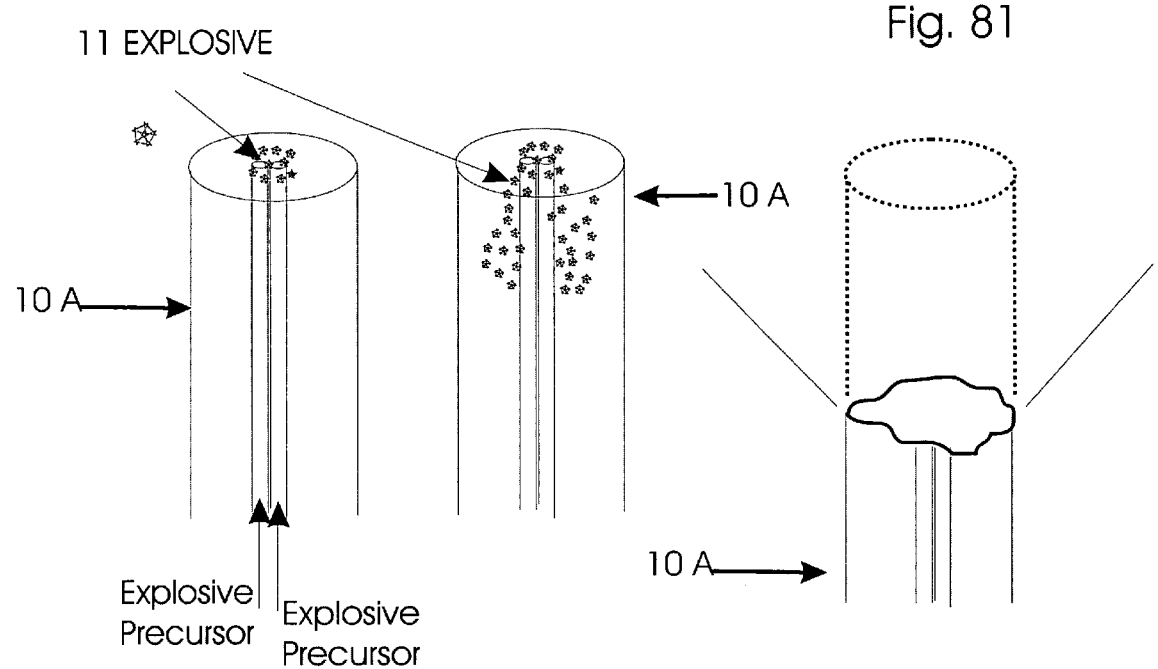
FIGS. 81-82 illustrate methods for causing explosives at particular location in tubes, and the useful effects and applications thereof.
Figure 82:
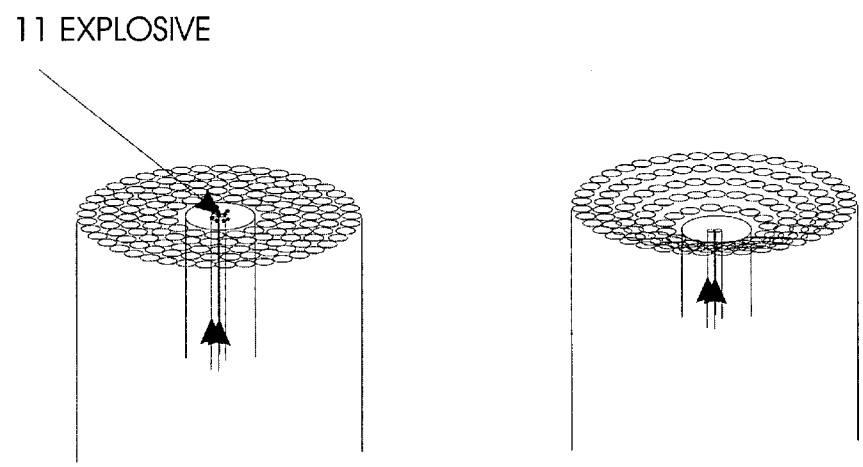

FIG. 81 shows an example of the use of a small amount of explosive to remove a section of nano-tube 10A. The chemical precursors in solution are allowed to mix at the ends of two adjacent tubes inside the larger tube 10A. The explosive forms and precipitates out of solution and accumulates along/around the end of the tube 10A. The explosive is detonated by electric charge or other means. A nano-blast this size releases such a small amount of energy it should not cause harm to the array or users nearby. In FIG. 82 is shown another example of the use of a nano-blast. In this example a depression is formed in the face of an array of tubes.

Figure 83:
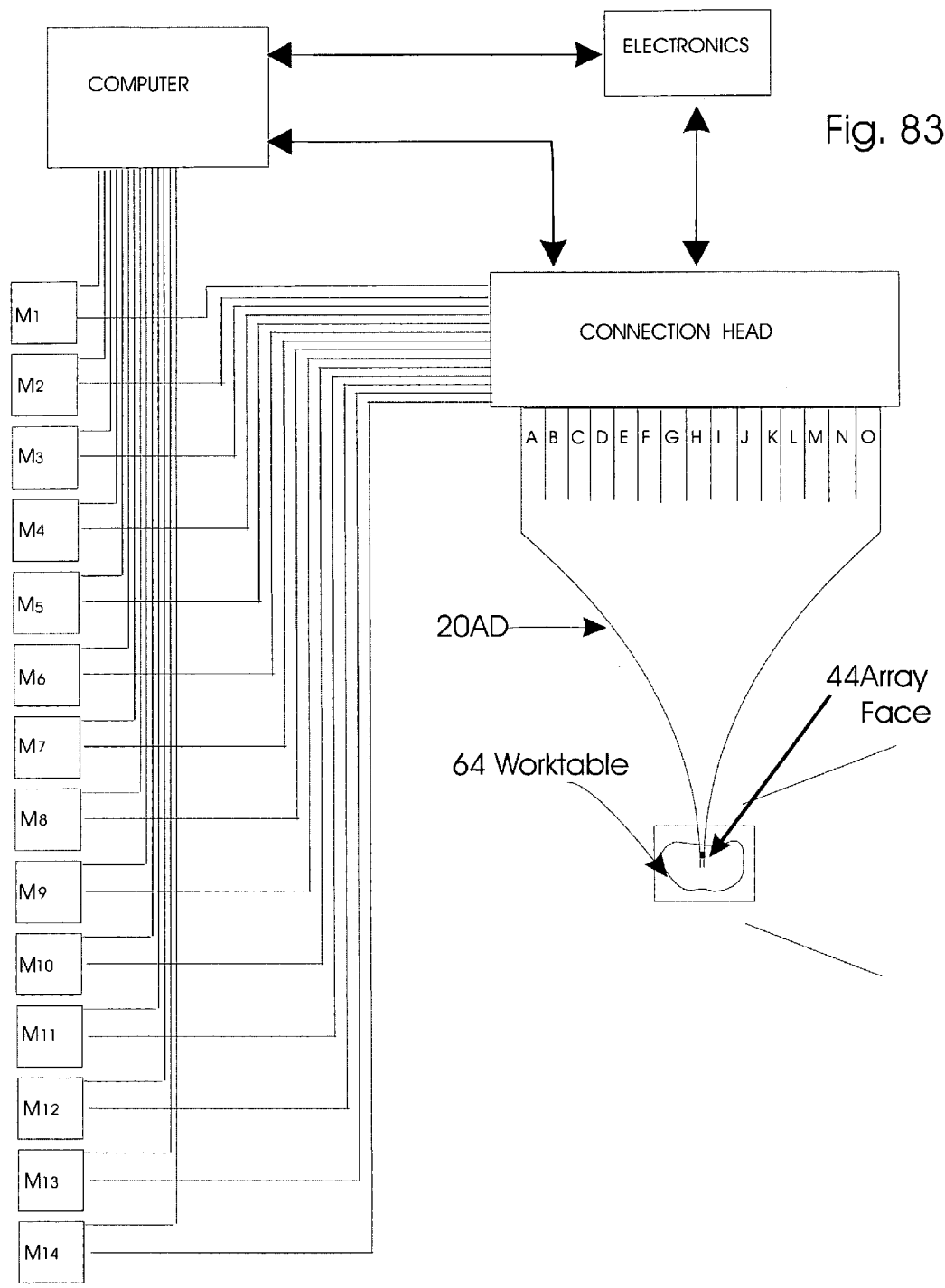
FIGS. 83-84 is an exemplary configuration of a computer control and interface for interacting with the plurality of tubes to provide materials, light, voltages, electricity etc., to program one or several of the tubes at particular times.

In one embodiment shown in FIG. 83, the invention consists of an electronics module connected to a computer and software which is in turn connected to a series of material control modules, connected in parallel to the connection head, which is connected to the nano-tube array, and also to the electronic control module. These parts all work together to carry out the instructions given provided by the software program. Other controlling system are possible, as the system of FIG. 83 was provided as one example.

Figure 84:
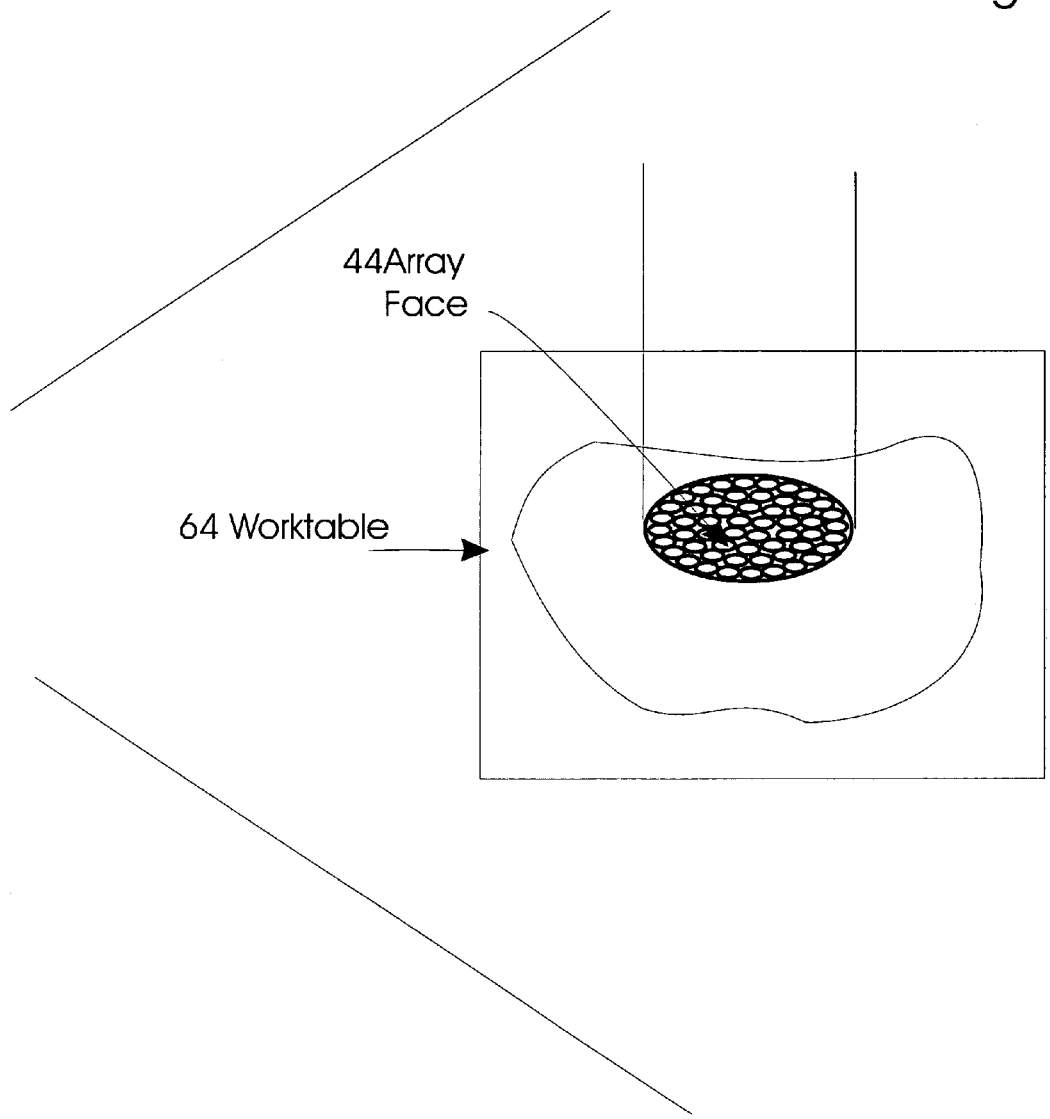

In FIG. 84 is an example of the array face 44 at a work table 64. In FIG. 85 is an example of array slices 46 taken from the end of the drawn end of an array. In the embodiment shown in FIG. 86, an array slice 46 can be placed in a system to be analyzed/explored and can be left unattached to the array face 44. The array slice 46 or chip may be reconnected by use of guides and registration. This feature may be useful in biological research.

Figure 87:
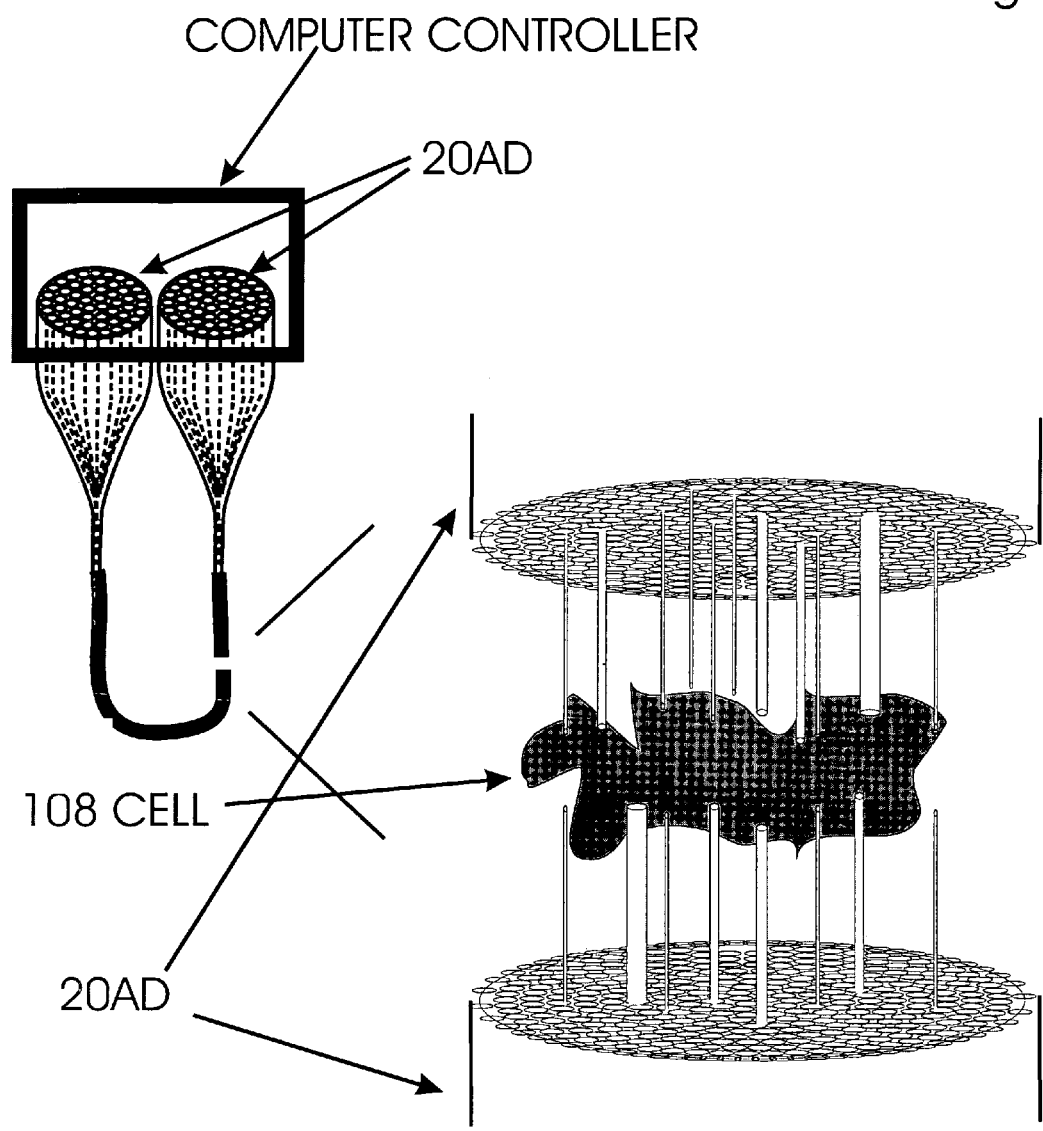

FIG. 87 shows one of many embodiments of two opposing array faces in relation to a cell. In this embodiment, tubes project from the array face 20AD. The many tubes of various configurations can penetrate the wall of a cell. In this example, the conductors associated with the tubes can deliver or measure charge to or at various locations inside the cell. The tubes may deliver molecules or take samples of molecules at various locations inside the cell. Variations in chemical composition and or electric charge may be monitored over time. All this activity may also take place with two or more cells of like or different kind. With the use of 2 or more, as many as required or that there exists physical space for, many cells may be monitored in a living system. One of the advantages of the small size of the tubes that enter the cell is that a minimum of damage and or disruption will occur.

Figure 88:
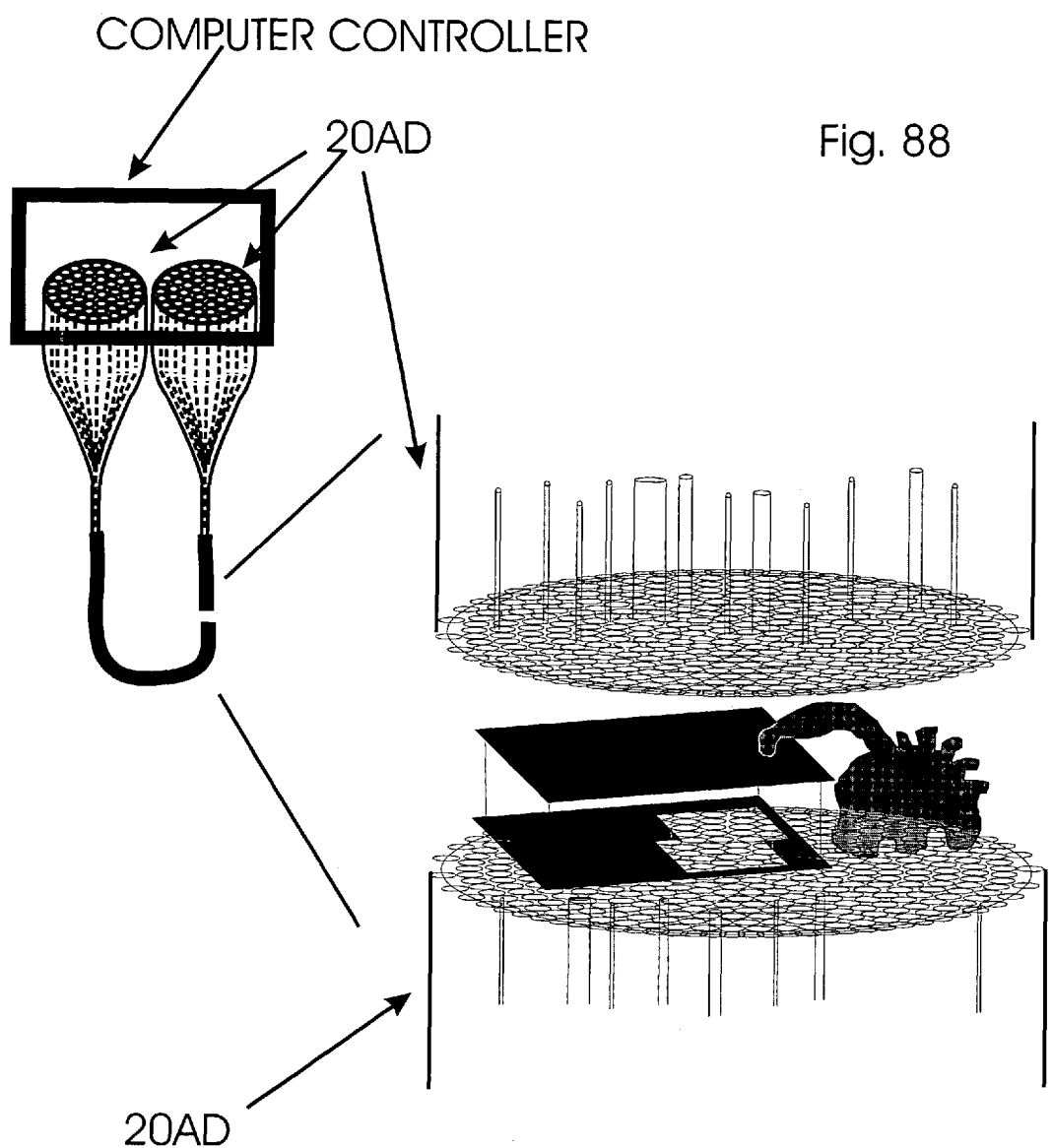

FIG. 88 shows an embodiment of the invention for constructing devices. In this embodiment, a physical device is constructed by passing material out the tube ends precisely. The material can be made to harden by physical or chemical means. Construction proceeds by means of continuous layering of material. Gas and or liquid pressure applied through various tubes is a means of controlling shape. In many embodiments of the invention, various connectors can be made to provide a means of connecting physically and or electrically and or optically between the nano-dimension and the larger dimension of every day life (e.g., the larger side of the preform).

Figures 90, 91:
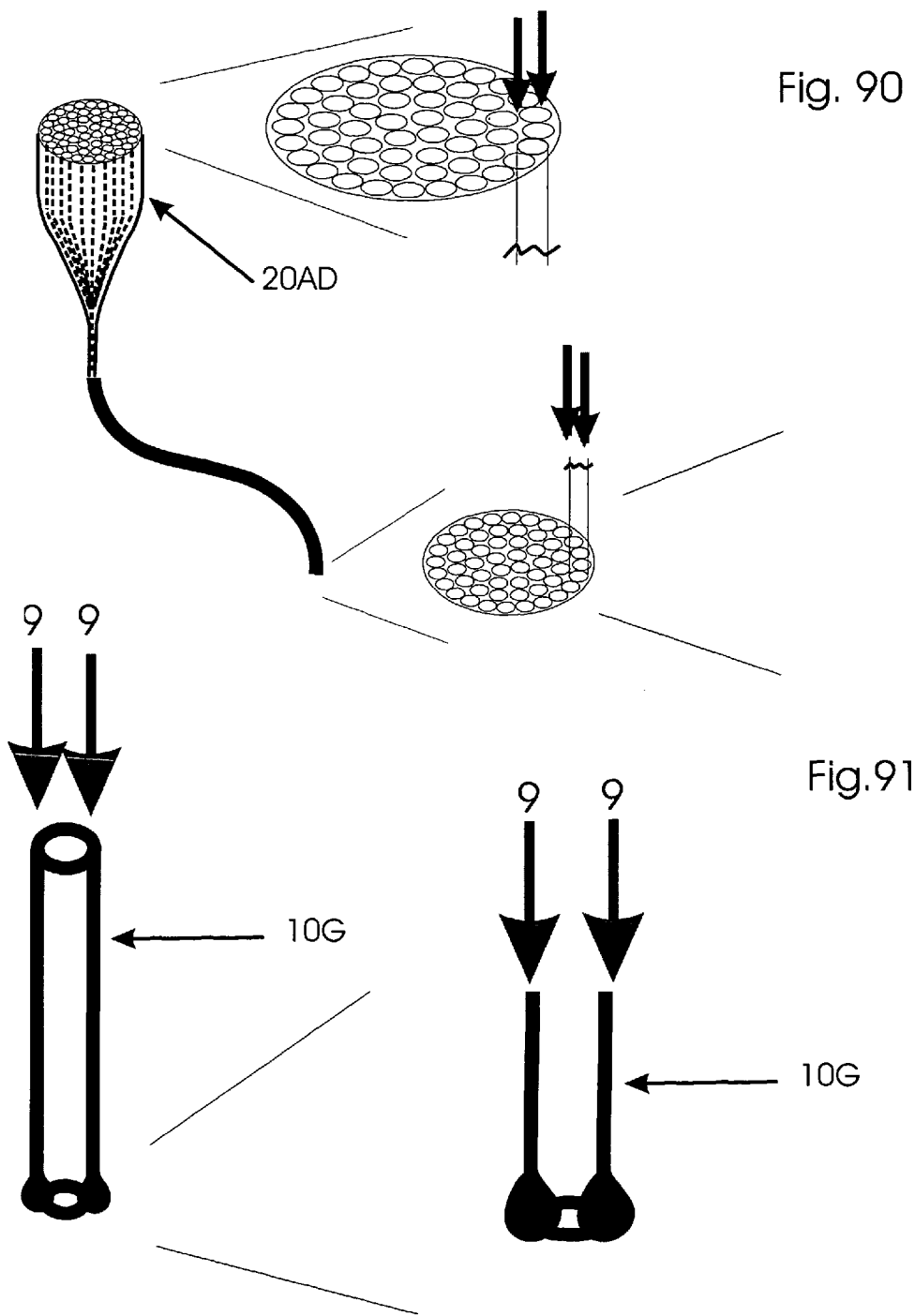
Figure 92:
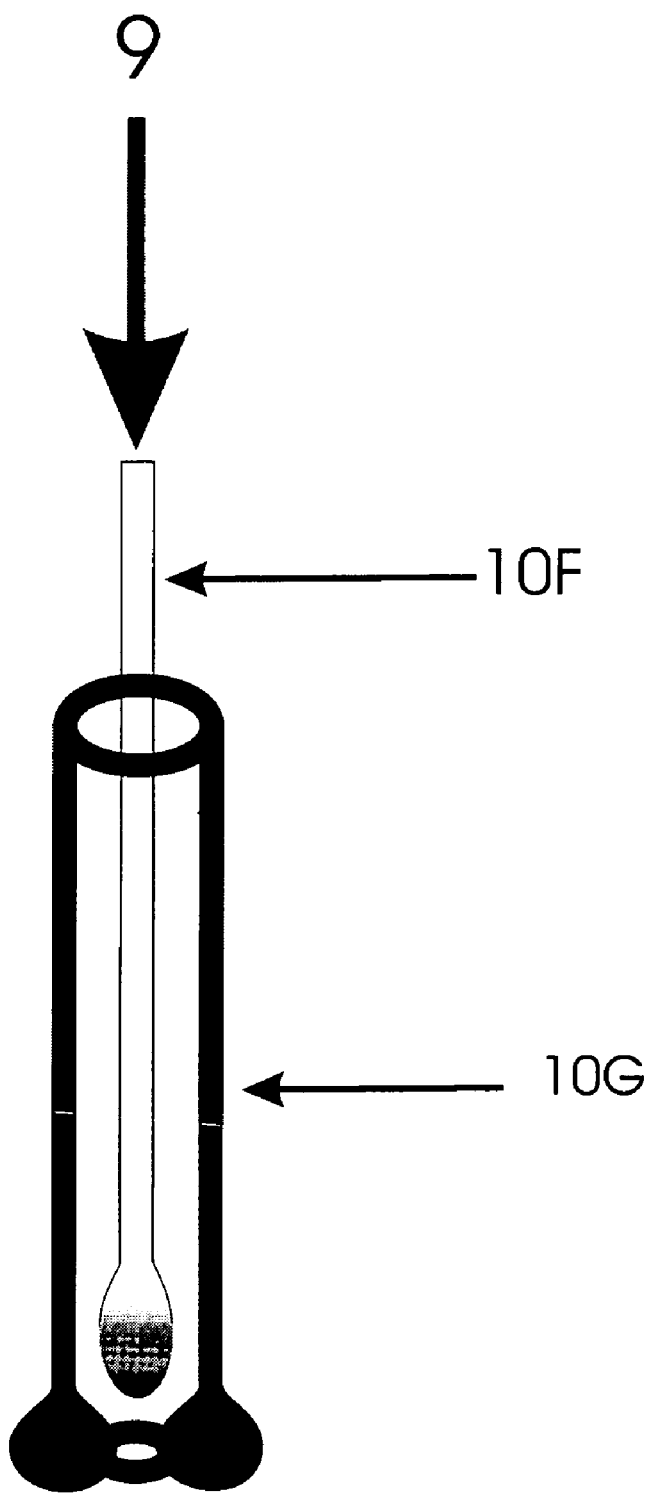

FIG. 89 shows an example of melting the tip of glass rod 22A by direction of infrared radiation through the opposite end of the tube. The end of the tube will absorb the infrared because it has an irregular surface. In FIGS. 90 and 91, an example is shown of melting the end of tube 10A by direction of infrared radiation 9 through the large end of the tube 10A in preform 20AD. The edge of tube 10A at the array face melts and thickens making the opening diameter smaller. In FIG. 92, an example of heating the tip of rod 20E contained in tube 10G is shown. In FIG. 93 is shown an example of the mechanism of action. In this embodiment infrared light is directed through rod 20E, which heats the end because the radiation is internally reflected by the round surface at the end of rod 20E. The end of rod 20E in turn heats the liquid 11 which is in contact.

Figure 98:
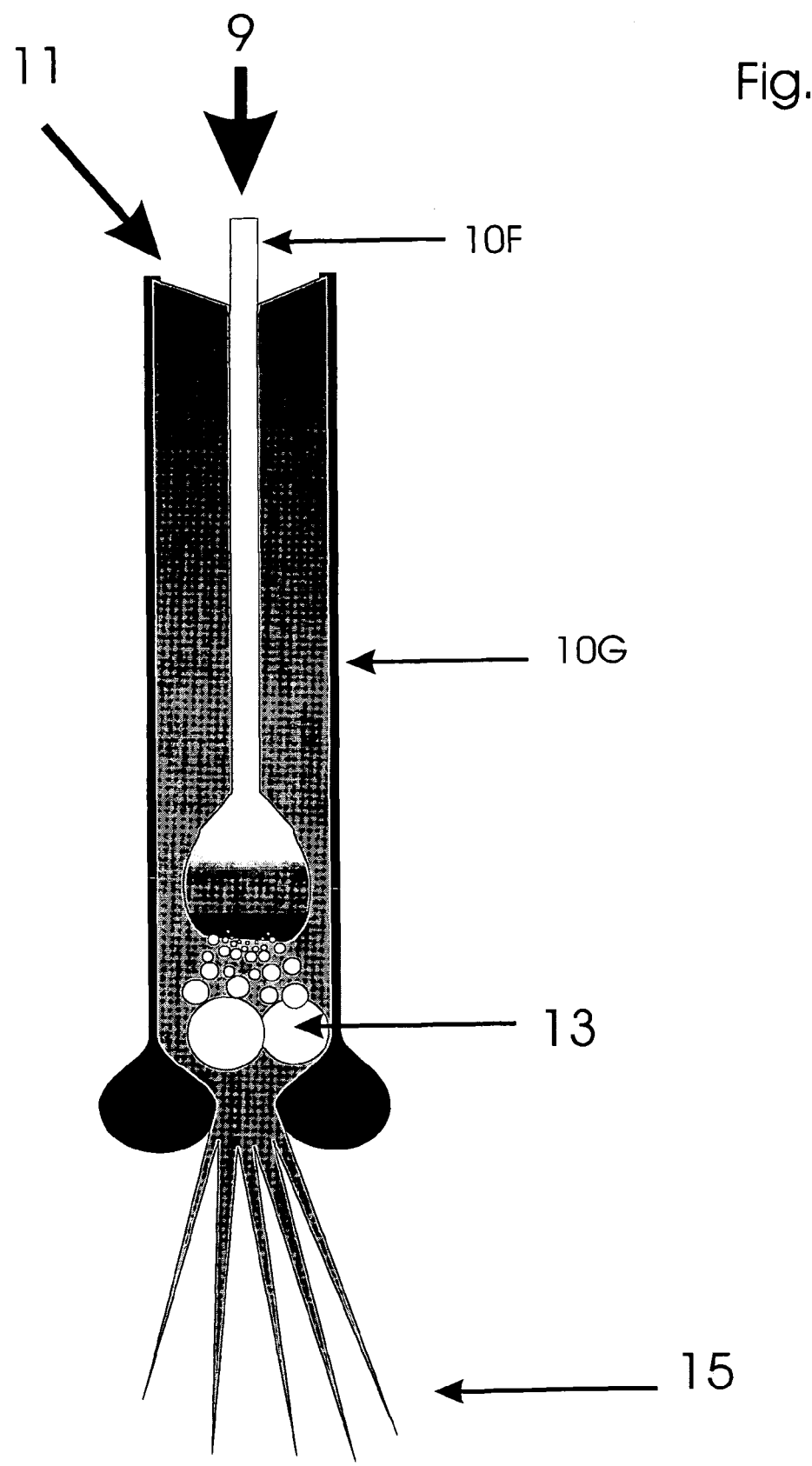

The embodiment in FIG. 98 shows the evolution of steam or vapor as heating progresses. In this embodiment, the area between the diameter of rod 20E and the inside diameter of tube 10 G is less than the area of the opening of the end of tube 10E, allowing the vapor to push liquid through the opening of tube 10E.

Figure 99:
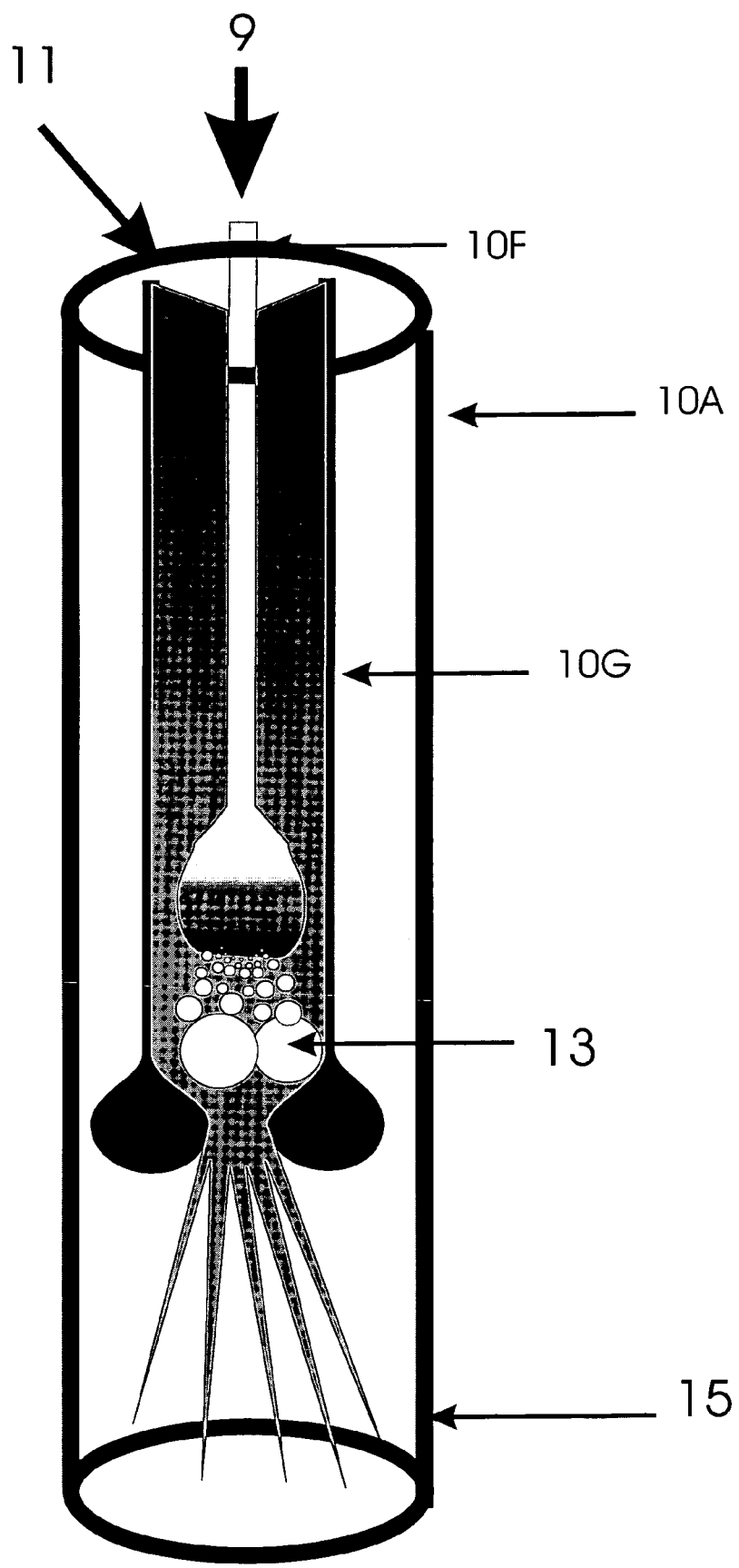

In the embodiment shown in FIG. 99, the assembly shown in FIG. 98 is placed inside a larger tube 10A. In this embodiment the action of the assembly FIG. 99 pushes fluid or gas through tube 10A. The fluid can be any type of fluid, such as simple water type liquids, solutions, chemicals, inks, biological samples, fluids with partial or full solids, sands, etc.

Many embodiments, as different preforms, whose construction is designed to be utilized as a tool for constructing specific items or devices at nano or partial nano dimension, can be designed and formed.

The embodiments of this invention therefore provide a means of reaching from room size to nano size, and performing physical operations. In one embodiment, the smaller drawn end can produce tubes in the range of nanometers, and specific examples with particular implementations can be tubes having dimensions of less than about 3000 nanometers, or less than 500 nanometers, or less than 250 nanometers, or less than 100 nanometers, or between about 1 and 100 nanometers, or between 10 and 50 nanometers, and some specific embodiments the sizes can be about 20 nanometers in size. In some embodiments, the bundle of tubes includes a mixture of different sizes, and different tubes can be used for different materials, fluids, light waves, etc.

The invention by its operation can supply material and energy in a controlled and specific means at nano dimension, and through utilizing properties of matter and energy unique at the nano-dimension will manufacture and or elucidate structures which are difficult or impossible to construct or observe by room dimension means.

As noted above, a preform of a number of tubes is drawn to a predetermined length. The drawn end of this preform may be one of the tubes that constitute another preform. Then, the second preform will be drawn. One of the tubes at its small end will be an assembly of tubes that has been drawn twice, as will be discussed with reference to Figures.

Another embodiment is a preform which has tubing connected at one end and the other end is drawn to a smaller size but not all the way to nano dimension. The resulting assembly is then used in another preform of which it is the central member. It is surrounded by several concentric rows of tubes with their top ends bent away from the center at a shallow angle, an angle steep enough to allow the attachment of tubing. These tubes are set against the first assembly so the bend is against the neck of the first preform. The new preform is drawn but once again not all the way to nano. This step can be repeated as many times as desired to attain nanotubes at the center of the array surrounded by concentric rows of tubes of increasing diameter. An array of nanotubes can be assembled through repeated partial drawing in such a way that large and small tubes can be in almost any physical relationship to each other and also be addressable physically and electrically.

A preform of glass tubes can be heated at the center of its length to draw the tubes smaller. By heating and pulling continuously while applying positive gas pressure inside the tubes the diameter can be controlled. A preform assembled from bent tubes can be assembled in such a way that the large end of every other tube can be grouped together separate from the remaining tubes. This will allow intimate mixing of substances passed through each group of tubes addressed at the large end and passing out of the tubes at the small end.

In another embodiment, by keeping positive pressure and or maintaining a slightly cooling flow of gas through various tubes as the preform is pulled will keep the bent tubing from collapsing. To improve flow and control gas pressure a vacuum can be applied to the opposite end.

A nano-charge of explosive such as lead azide can be set off electrically or by other means inside a tube to make a hole in the side of the tube or to break a tube or affect a reaction taking place at the end of the tubes.

Particles of substances that are susceptible to microwaves can be placed in a tube and heated. Differing arrays can be useful for different purposes such as mixing different compounds with different physical properties and reaction rates, mixing liquids with gases. For biological work it may be useful to have large diameter tubes and or rods interspersed with nanotubes or nano-rods. Probing cells, delivering organic substances, drugs, chemicals, and measuring electrical activity may be facilitated by differing tube sizes. A group of tubes located inside a larger tube or inside two larger concentric tubes can combine reactants which may form a substance that can be contained in a sleeve of material that flows from the space between the surrounding concentric tubes. Consequently reactions can proceed in stages. Alternatively, a thread or string can be formed that has a sleeve around it. This can yield a thread with unique properties. The thread can contain adhesive or separate compounds which when combined become hard or form a compound with useful properties in association with the thread. The compound forming substances can be distributed asymmetrically in the thread which when activated will make the thread move. This can be done with as many layers as desired. In one example, this technique can be used to make batteries or fuel cells with conductors. Also light signals directed along the tubes can be used to determine or map their location.

In one embodiment, charge at the end of the nano-tube may be used to control flow. In several embodiments, an arrangement of one nano-tube inside another with strategically placed conductors could mix substances at a controlled rate using charge at their openings to regulate flow. In other embodiments, these embodiments can also be used in conjunction with magnetic or electric fields. In one embodiment, soluble glass can be used in construction of nanotubes or nano-rods. Still further, nanotubes can be used to manufacture enclosed assemblies.

Placing rods of soluble glass around the perimeter of an insoluble tube or insoluble rod and then placing them inside an insoluble tube and then drawing and dissolving away the soluble rods results in a tube or rod that is free to move inside another tube which may be of use especially in a cell probe.

In one embodiment, a group of tubes can be contained in a larger tube and be held together by the tube for ease in handling during the drawing process. Also, a channel made by dissolving soluble glass may be used to deposit vapor in a preferred location, even without the use of a glassy conductor. Further, light can be directed inside the tube or inside the glass or both.

Light may be affected by the electric charge or the associated magnetic field. In one embodiment, different kinds of glasses may be affected in various ways by the application of electric charge. These effects may influence the path of light in a manner that can be used to convey or store information.

An assembly of tubes may be formed and then broken or cut in half across the length. The resulting faces will have their tubes aligned with each other. A signal (light) directed through a tube will pass across the gap and pass through the corresponding tube on the other side. Rods of the correct/appropriate size to transmit a particular wavelength to be used for alignment may be included in the array, of tubing. Light signals or various other means can be used to align the assemblies. The tubes can also be used to place a molecule (or e.g., DNA) in the gap. The molecule can be anchored chemically or mechanically. Light can then be passed through the tubes. A silhouette or shadow of the molecule will be formed. A rod down the center of a tube may be used to probe the molecule. An electric charge may be sent to probe the molecule.

The molecule can be detected by the signal being affected by the molecules presence and the effect being read from the matched tube or rod. Chemicals and or organic molecules can be delivered to specific areas of the pinned molecule. Light of differing wavelengths can be directed through the tubes to impinge on the molecule. Signals may/can be directed at the molecule/parts of the molecule by instruments external to the preform or preforms. Detection and recording of movement and or changes in structure of various parts of the molecule and analysis of many such events may help elucidate the structure and or the topography/folding of the molecule.

A molecule or molecules secured by any of various means at or near the work surface can be molded by introduction of chemical monomers to the surface of the molecule and subsequent polymerization by various means. The mold can be held in place for later use or removed from the workspace and collected or stored at the work surface.

One embodiment the invention may be used to manufacture physical or chemical or electrical, or any combination of these, connectors that make the connection between the nano dimension and room size.

In one embodiment, the cross section of a nanotube group can be a work surface for cells being examined. The different tubes can deliver nutrients and bodies that may interact with the cell. There can be multiple adjacent cradles and which are able to interact with each other through physical channels and or electrical and or chemical pathways constructed on the workspace or through connection by way of the manifold of the invention. Interactions can be observed and measured.

The tube assembly can be cut at varying angles and mated together for various effects. In on embodiment it can be cut at different angles for various amounts of reflection of signals propagated through the array. The array can be cut and attached to a transmitting rod allowing signals to propagate through the rod.

A varying magnetic or electric field may push molecules or ions through the tubes. Which may enhance flow through the tubes and/or help mixing properties.

An array of conducting nanotubes or rods can be sequentially charged so that a single or several other tubes or rods in proximity to the sequentially charged nano rods/tubes can be made to move or vibrate in response to the charges or voltages applied. The ends of tubes/rods could be made to rotate or move in more complex patterns, as can be programmably set. A molecule placed at the end of a tube could be catapulted by this mechanism. This mechanism could be used to agitate or stir. Positive negative sequential charging can be used for attracting and moving molecules. Also this technique can be used for pulling molecules apart, especially if a reagent or enzyme etc is introduced via a nanotube to an appropriate location on a molecule, while the molecule is simultaneously manipulated. Furthermore, tweezers can be made using this mechanism.

The overall physical strength of the assembly is important because the rate of flow through the nanotubes will be hampered by the amount of resistance to flow caused by the nano size of the tubes. The amount of pressure which can be applied to increase flow will depend on the strength of the assembly and the distance a substance must travel through the nanotubes. A system of ribbing accomplished by using thick walled tubing in the preform can supply additional strength. Using microwave heating for melting this type of preform will increase uniformity of heating and subsequently increase uniformity of the finished array.

An array of nanotubes and or nanorods with varying diameters for the purpose of providing pathways for varying wavelengths of light and conducting nanotubes can be used for qubit computing. Balancing the amount and type of charge at the ends of the array of various size and kinds of nanorods and nanotubes can manipulate qubits in order to effect a qubit processor. A layer of an electrically active material can be placed over the end of a tube or rod and connected to conductors on or inside the rod or tube. When charge or voltages are applied the material layer, it is possible to control transmission of a signal through the layer.

The uses of the embodiments described herein are numerous. A nanoarray in the form of an array of spots of biological or chemical samples ("probes") immobilized at predefined positions on a substrate, can be provided. Each spot can contains a number of molecules of a single biological or chemical material. To interrogate the array, the nanoarray can be flooded with a fluid containing one or more biological or chemical samples, elements of which typically interact with one or more complementary probes on the nanoarray: In DNA nanoarrays in particular, the probes can be oligonucleotide or cDNA strains, and the target can be a fluorescent or radioactive-labeled DNA sample. The molecular strands in a target hybridize with complementary strands in the probe nanoarray. The hybridized nanoarray can be inspected by a nanoarray reader, which can detect the presence of the radioactive labels or which stimulates the fluorescent labels to emit light through excitation with a laser or other energy sources. A reader can then detect the position and strength of the label emission in the nanoarray. Since the probes are placed in predetermined and thus known positions in the nanoarray, the presence and quantity of target sequences in the fluid are identified by the position at which fluorescence or radiation is detected and the strength of the fluorescence or radiation.

Therefore, implementing nonotubes for constructing nanoarrays, provides an extremely useful tool to conduct biological or chemical experiments in a massive parallel fashion because of the large number of different probes that one can fabricate onto the nanoarray. It is particularly powerful in screening, profiling and identifying DNA samples. Given the many implementations and uses of nanotubes, the breadth of applications should be viewed with broad and encompassing strokes, not limited to any particular industry (e.g., whether it be in the bio-sciences, computing, or space exploration).

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A plurality of tubes defined in a preform, comprising:
   a first end of the preform defining a source side of the preform;
   a second end of the preform defining a delivery side of the preform, wherein at least one tube of the plurality of tubes of the second end of the preform is drawn to a dimension of at least less than one micron in size;
   a first and second conducting stripe defined inside a particular one of the plurality of tubes, the particular tube capable of flowing a material between the first end and the second end of the preform;
   a first electrical contact for coupling the first conducting stripe to a first voltage source; and
   a second electrical contact for coupling the second conducting stripe to a second voltage source,
   wherein the first voltage source and the second voltage source are each capable of being applied when the material is flowing between the first end and the second end of the preform.

2. A plurality of tubes defined in a preform as recited in claim 1, wherein each of the first voltage source and the second voltage source defining a respective current along the first and second conducting stripe.

3. A plurality of tubes defined in a preform as recited in claim 2, further comprising:
   a target receiver for receiving the material from the plurality of tubes defined in a preform, wherein the respective currents define a magnetic field within the particular tube, and the magnetic field of each of the respective currents being capable of acting on the material at any time when the material flows between the first end and the second end or when the material is delivered to the target receiver.

4. A plurality of tubes defined in a preform as recited in claim 3, wherein the target receiver is a material, a cell, a group of cells, a fluid, a sample or a substrate.

5. A plurality of tubes defined in a preform, comprising:
   a first end of the preform defining a source side of the preform;
   a second end of the preform defining a delivery side of the preform, wherein at least some tubes of the plurality of tubes of the second end of the preform are drawn to a dimension of at least less than one micron in size; and
   the plurality of tubes including one tube having an inner conductor coupled to an inner wall of the one tube and an outer conductor coupled to an outer wall of the one tube, such that the inner and the outer conductor are separated by walls of the one tube, and current can be applied to either one or both of the inner conductor or the outer conductor,
   wherein applying current to either one or both of the inner conductor or the outer conductor enables application of current to a material that is capable of passing through the one tube.

6. A plurality of tubes defined in a preform, comprising:
   a first end of the preform defining a source side of the preform;
   a second end of the preform defining a delivery side of the preform, wherein at least one tube of the plurality of tubes of the second end of the preform is drawn to a dimension of at least less than one micron in size;
   a conducting stripe defined inside a portion of a particular one of the plurality of tubes, the particular tube capable of flowing a material between the first end and the second end of the preform;
   a first electrical contact for coupling the first conductor to a first voltage source; and
   a second electrical contact for coupling the second conductor to a second voltage source,
   wherein the first voltage source and the second voltage source are each capable of being applied when the material is flowing between the first end and the second end of the preform.

7. An apparatus using a plurality of tubes defined in a preform, comprising:
   a computer coupled to a connection head;
   a plurality of tubes defined in a preform including,
     a first end of the preform defining a source side of the preform coupled to the connection head;
     a second end of the preform defining a delivery side of the preform, wherein at least some tubes of the plurality of tubes of the second end of the preform are drawn to a dimension of at least less than one micron in size; and
     an array face defined from the second end of the preform, the array face configured to reconnect with an array slice taken from the end of the second end of the perform, wherein the array slice is configured to hold one or more material samples.

* * * * *